US009106870B2

(12) United States Patent
Okubo

(10) Patent No.: US 9,106,870 B2
(45) Date of Patent: Aug. 11, 2015

(54) PRINTING APPARATUS AND IMAGE PROCESSING APPARATUS THAT RESTRICTS USER INPUT UNDER CERTAIN CONDITIONS

(71) Applicant: Oki Data Corporation, Tokyo (JP)

(72) Inventor: Tsuyoshi Okubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 36 days.

(21) Appl. No.: 13/950,346

(22) Filed: Jul. 25, 2013

(65) Prior Publication Data

US 2014/0029041 A1  Jan. 30, 2014

(30) Foreign Application Priority Data

Jul. 27, 2012 (JP) ................. 2012-166880

(51) Int. Cl.
*H04N 1/44* (2006.01)
*H04N 1/00* (2006.01)
*G06K 15/00* (2006.01)

(52) U.S. Cl.
CPC ............ *H04N 1/4433* (2013.01); *G06K 15/005* (2013.01); *G06K 15/4055* (2013.01); *H04N 1/0048* (2013.01); *H04N 1/00408* (2013.01); *H04N 1/00856* (2013.01); *H04N 1/4426* (2013.01)

(58) Field of Classification Search
None
See application file for complete search history.

(56) References Cited

U.S. PATENT DOCUMENTS

2003/0142353 A1* 7/2003 Allen et al. ................. 358/1.16
2012/0182579 A1* 7/2012 Hibi et al. ................... 358/1.15
2013/0288778 A1* 10/2013 Johnson ...................... 463/25

FOREIGN PATENT DOCUMENTS

JP  2010-136440 A  6/2010

* cited by examiner

*Primary Examiner* — Thomas D Lee
(74) *Attorney, Agent, or Firm* — Marvin A. Motsenbocker; Mots Law, PLLC

(57) ABSTRACT

An image processing apparatus includes an input unit configured to receive an user's input, a display configured to display a status of the image processing apparatus, and a controller configured to limit an operation of the input unit. The controller is configured, if the image processing apparatus is not in progress of any image processing when a certain condition is satisfied, to display information of the limitation of the operation of the input unit at the display. The controller is configured, if the image processing apparatus is in process of an image processing when the certain condition is satisfied, to display a status of the image process at the display, and then to display the information of the limitation at the display after the image process is completed.

10 Claims, 15 Drawing Sheets

Fig.4 A
| SCREEN | DISPLAY LEVEL |
|---|---|
| SET MODE SCREEN | 200 |
| SCANNING SCREEN | 150 |
| PRINTING SCREEN | 140 |
| PROCESSING DATA SCREEN | 130 |
| ⋮ | ⋮ |
| PANEL LOCK SCREEN | 100 |
| ⋮ | ⋮ |
| COPY STANDBY SCREEN | 50 |
| IMAGE SCAN STANDBY SCREEN | 50 |
Fig.4 B
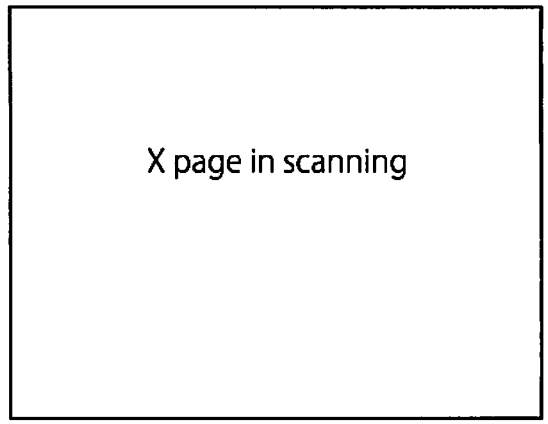
Fig.4 C
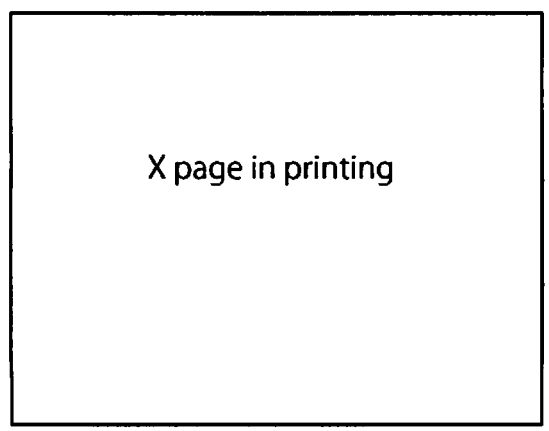

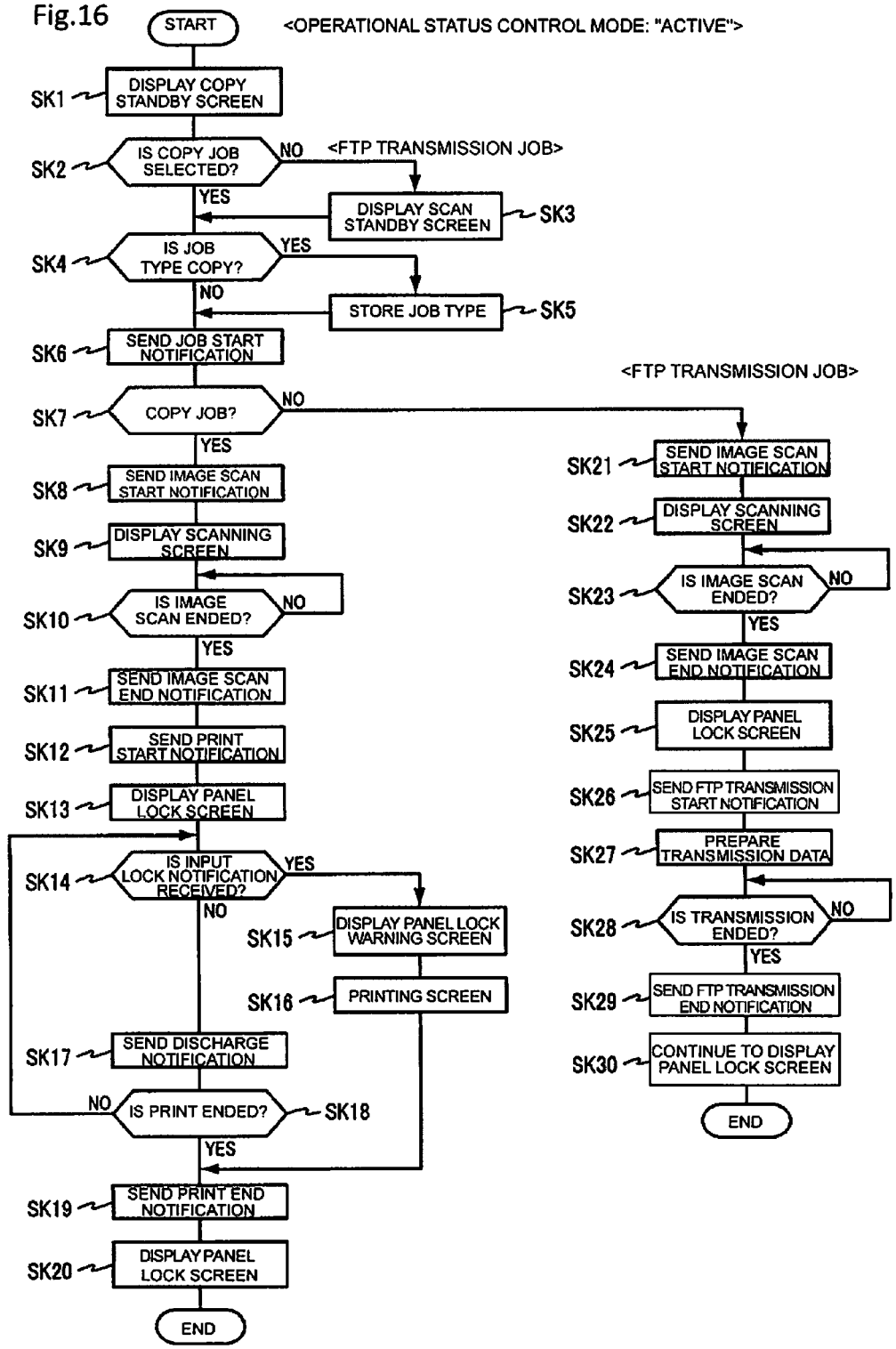

PRINTING APPARATUS AND IMAGE PROCESSING APPARATUS THAT RESTRICTS USER INPUT UNDER CERTAIN CONDITIONS

CROSS REFERENCE TO RELATED APPLICATIONS

This application claims priority based on 35 USC 119 from prior Japanese Patent Application No. 2012-166880 filed on Jul. 27, 2012, entitled "PRINTING APPARATUS", the entire contents of which are incorporated herein by reference.

BACKGROUND OF THE INVENTION

1. Field of the Invention

This disclosure relates to an image processing apparatus and a printing apparatus, such as a multifunction peripheral or a printer, configured to perform an input restriction (for example, an input lock) or to cancel the input restriction.

2. Description of the Related Art

A conventional multifunction peripheral (MFP) permits login of a user by prompting the user to input a PIN and authenticating the user based on the PIN. Then, the multifunction peripheral accepts a batch of multiple processes from the user thus authenticated to log in. If the user logs out by mistake during execution of the processes or when a predetermined timeout period elapses with the processes left unexecuted, the unexecuted processes are saved so that they can be loaded and executed at the time of a next login (see, for example, Japanese Patent Application Publication No. 2010-136440 (paragraphs 0052 to 0061 and FIG. 12)).

Further, as a matter of general practice, an authentication device having an authentication function is connected to a printing apparatus, such as a multifunction peripheral or a printer, so that only a user authenticated by the authentication device is allowed to use the printing apparatus. Then, when a predetermined time period elapses after the authentication, the user is disabled from using an input display unit.

However, such a conventional technique has the following problem. Specifically, if a panel lock screen (serving as a panel restriction screen) is displayed to disable or limit use of the input display unit in the middle of a job, such as a copying job (Copy) or a file transfer protocol (FTP) transmission, this reduces the convenience for the user.

SUMMARY OF THE INVENTION

An object of an embodiment of the invention is to improve user convenience.

An aspect of the invention provides a printing apparatus configured to perform an input restriction or to cancel the input restriction according to a notification received from an authentication device. The printing apparatus comprises: a job manager configured to manage a job to be executed and to give notice of the start of a process necessary to execute the job; an input-unit controller configured to control which screen to display on a display part of a display input unit, and to control an input status of an input button of the display input unit; an operational status manager configured to retain a current execution status of a process and a current input status of the input button; and a panel restriction controller configured to receive, from an authentication device, an input restriction notification to limit input of the input button of the display input unit, and an input restriction cancel notification to cancel the input restriction. A display level is preset for each screen to be displayed on the display part, and an operational status control mode of the printing apparatus is set to be active or inactive. Upon receipt of the input restriction cancel notification from the authentication device, the panel restriction controller notifies the input-unit controller of cancellation of the input restriction to display an initial screen on the display part. Upon receipt of the input restriction notification from the authentication device, if the operational status of the printing apparatus retained by the operational status manager is a busy status, the panel restriction controller sends a notification of the input restriction to the input-unit controller after postponing the sending until the operational status changes to an idle status. If the operational status of the printing apparatus retained by the operational status manager is the idle status, the panel restriction controller immediately sends the notification of the input restriction to the input-unit controller upon the receipt of the input restriction notification. Upon receipt of the notification of the input restriction, if the operational status control mode is set to be active, the input-unit controller displays a panel restriction screen on the display part. Upon receipt of the notification of the input restriction, if the operational status control mode is set to be inactive, the input-unit controller compares the display level of a current screen currently being displayed with the display level of a next screen to be displayed next, and displays the screen with the higher display level on the display part.

Another aspect of the invention provides a printing apparatus including an input unit configured to receive an user's input; a display configured to display a status of the image processing apparatus; and a controller configured to limit an operation of the input unit. The controller is configured, if the image processing apparatus is not in progress of any image processing when the certain condition is satisfied, to display information of the restriction at the display. The controller is configured, if the image processing apparatus is in process of an image processing when a certain condition is satisfied, to display a status of the image process at the display, and then to display information of the restriction at the display after the image process is completed.

BRIEF DESCRIPTION OF THE DRAWINGS

FIG. 4A is an explanatory diagram showing an example of the configuration of a display level table of Embodiment 1.

FIG. 4B is an explanatory diagram showing an example of a scanning screen.

FIG. 4C is an explanatory diagram showing an example of a printing screen.

FIG. 16 is a flowchart showing the operation performed by the multifunction peripheral of Embodiment 2 when the operational status control mode is set to "active."

DESCRIPTION OF THE PREFERRED EMBODIMENTS

Figure 1:
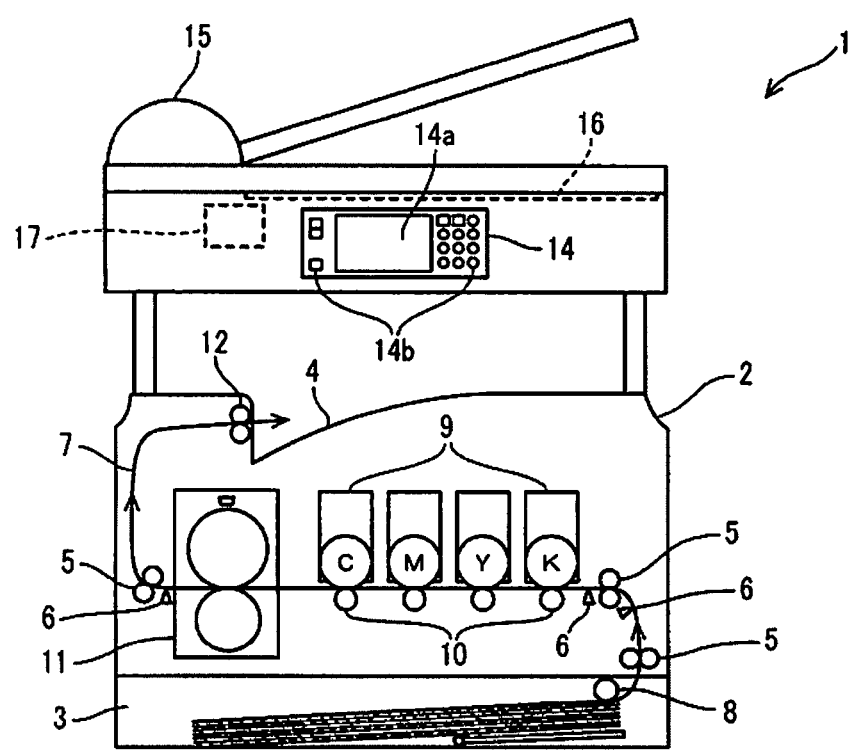
FIG. 1 is an explanatory diagram showing the schematic configuration of a multifunction peripheral of Embodiment 1.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Embodiments of a printing apparatus of the invention are described below with reference to the drawings.

Embodiment 1

A multifunction peripheral of this embodiment is described using FIGS. 1 to 11. Note that Copy, File Transfer Protocol (FTP) transmission, or the like executed by the multifunction peripheral and recognized by a user as a single process is called a job; whereas scan, print, or the like executed during the job and recognized by the multifunction peripheral as a single process is called a process (e.g., an image scan process or a print process).

In FIG. 1, reference numeral 1 denotes a multifunction peripheral as a printing apparatus.

Reference numeral 2 denotes a print unit of multifunction peripheral 1. Sheet feed cassette 3 configured to house sheets as printing media is placed under print unit 2. Stacker 4 on which printed sheets are to be stacked is placed on an external upper face of print unit 2. Sheet feed cassette 3 and stacker 4 are connected to each other by sheet conveyance route 7 along which conveyance rollers 5, medium detection sensor 6, and the like are provided. At a connection between sheet conveyance route 7 and sheet feed cassette 3, sheet feed roller 8 is provided configured to pick up a sheet one by one from sheet feed cassette 3 and feed it to sheet conveyance route 7. Image formation units 9 are placed downstream of sheet feed roller 8 in a sheet conveyance direction. Image formation units 9 house (contain) toner (developer) of color K (black), color Y (yellow), color M (magenta), and color C (cyan), respectively, with which toner images (developer images) are transferred onto a sheet conveyed. Transfer rollers 10 are placed at positions facing respective image formation units 9 with sheet conveyance route 7 interposed therebetween. Transfer rollers 10 are configured to transfer the toner images formed by image formation units 9 onto the sheet. Placed downstream of image formation units 10 are fixing unit 11 configured to fix the toner images transferred onto the sheet, and discharge rollers 12 configured to discharge the printed sheet from fixing unit 11 onto stacker 4.

In addition, display input unit 14 is placed above print unit 2 of multifunction peripheral 1. Display input unit 14 is provided with: display part 14a, such as an LCD, configured to display predetermined information to a user; input buttons 14b used to make detailed settings for a job, such as copy or FTP transmission, and to input a start command; and the like. There is also scanner 17 above print unit 2. Scanner 17 is an image scan unit configured to scan image data of a document which is fed onto contact glass 16 by auto document feeder (ADF) 15 or which is directly (manually) set on contact glass 16.

Display input unit 14 has, for example, the following functions. Upon receipt of a screen display notification from input-unit controller 32 (described later), display input unit 14 displays a screen on display part 14a containing the notification. In addition, display input unit 14 sends input-unit controller 32 an input start notification when display input unit 14 is first manipulated after multifunction peripheral 1 receives an input lock cancel notification (or an input restriction cancel notification) to hide a panel lock screen (or a panel restriction screen). In addition, every time any of input buttons 14b of display input unit 14 is pressed with a screen which can be manipulated by a user being displayed, display input unit 14 sends input-unit controller 32 a press notification for input button 14b to indicate the button has been pressed. In addition, when a user makes detailed settings for Copy or FTP transmission by operating input buttons 14b on a standby screen of each job, display input unit 14 generates setting information on the job. In addition, when a user instructs multifunction peripheral 1 to start Copy or FTP transmission by pressing input button 14b, display input unit 14 sends input-unit controller 32 a start notification for the job instructed (called a job start notification) along with the setting information for that job. In addition, when display input unit 14 receives a change in settings for an operational status control mode of multifunction peripheral 1, which is made by an administrator, a mode change notification is sent to input-unit controller 32.

Herein, the operational status control mode is a control mode set by an administrator to preset whether or not to notify authentication device 25 of the operational status of multifunction peripheral 1. If the operational status control mode is set to "active," multifunction peripheral 1 transmits an in-service notification or an out-of-service notification to authentication device 25, depending on the operational state of multifunction peripheral 1. If the operational status control mode is set to "inactive," multifunction peripheral 1 always transmits an OUT-OF-STATUS notification to authentication device 25.

Input-unit controller 32 and operational status manager 35 (described later) operate differently depending on the set operating status control mode.

Figure 2:
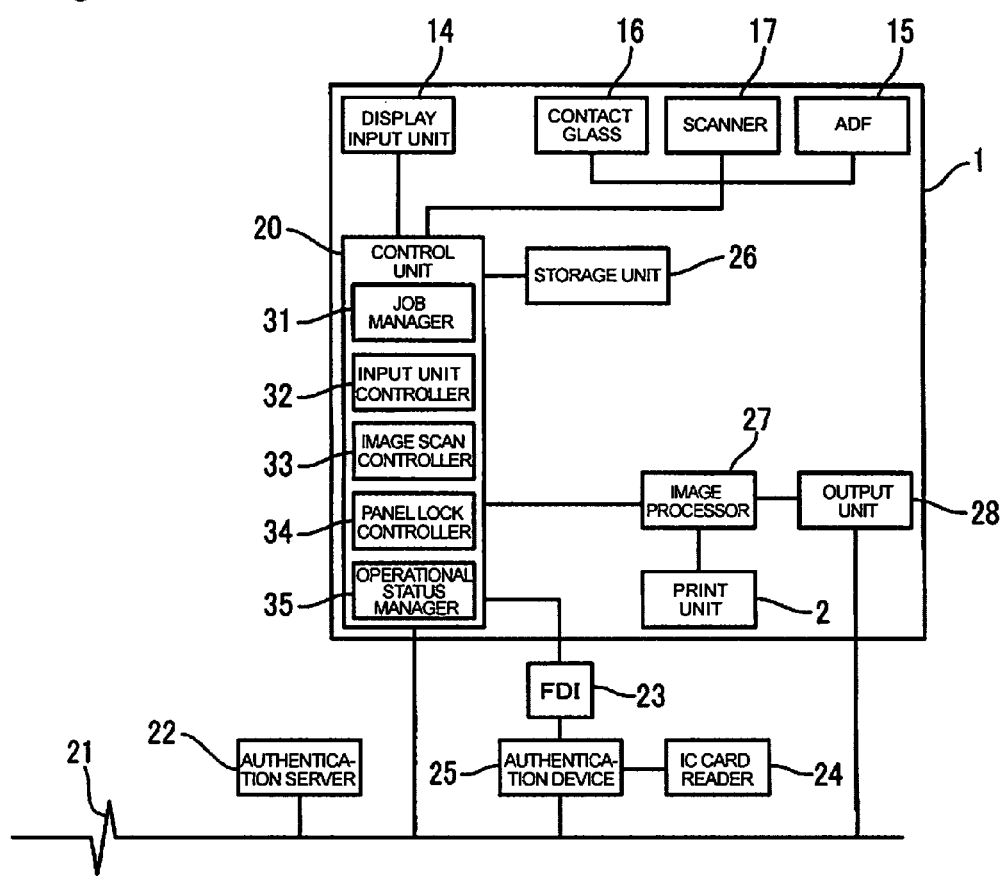
FIG. 2 is a block diagram showing the multifunction peripheral of Embodiment 1.

In FIG. 2, reference numeral 20 denotes a controller or control unit of multifunction peripheral 1. Via network 21, control unit 20 is connected to authentication server 22 and the like installed in a management center or the like. Moreover, via foreign device interface (FDI) 23, control unit 20 is connected to authentication device 25 to which IC card reader 24 is connected and which is installed on the same floor as multifunction peripheral 1. Control unit 20 has a function of executing a job such as Copy or FTP transmission by controlling each part of multifunction peripheral 1 based on programs stored in storage unit 26.

Herein, Copy is executed as follows. When a user sets a document on ADF 15 or contact glass 16 and operates input buttons 14b of display input unit 14 to instruct multifunction peripheral 1 to start Copy, image data of the document is read by scanner 17 and printed on a sheet by print unit 2 according to the Copy setting information inputted by the user. Then, the printed sheet is discharged onto stacker 4.

In addition, FTP transmission is executed as follows. When a user sets a document on ADF 15 or contact glass 16 and operates input buttons 14b of display input unit 14 to instruct multifunction peripheral 1 to start FTP transmission, image data of the document is read by scanner 17 and converted into a file in such a format as portable document format (PDF) according to the FTP transmission setting information inputted by the user. Then, the file is transmitted, based on FTP, to a designated folder in an FTP server (not shown) via network 21.

Reference numeral 27 denotes an image processor having, for example, the following functions. Upon receipt of a print start notification along with image data of a document read by scanner 17 from job manager 31 (described later), image processor converts the image data into print data printable by print unit 2 and sends the print data to print unit 2. In addition, upon receipt of a print completion notification and a discharge notification (made upon every discharge of a printed sheet) from printer 2, image processor sends job manager 31 a print end notification and a discharge notification. In addition, upon receipt of an FTP transmission start notification from job manager 31 along with image data, image processor 27 converts the image data into a file in a designated format and sends the file to output unit 28. In addition, upon receipt of a transmission completion notification indicating completion of FTP transmission from output unit 28, image processor sends a transmission end notification to job manager 31.

Print unit 2 has, for example, the following functions. Upon receipt of print data from image processor 27, print unit 2 prints the print data on a sheet by transferring toner images, which are formed by image formation units 9 based on the print data, onto the sheet fed from sheet feed cassette 3. Print unit 2 then fixes the toner images onto the sheet by using fixing unit 11, and discharges the sheet onto stacker 4. In addition, every time a single printed sheet is discharged onto stacker 4, print unit 2 sends a discharge notification to image processor 27. In addition, when print is completed, print unit 2 transmits a print completion notification to image processor 27.

Output unit 28 has, for example, the following functions. Upon receipt of a file from image processor 27, output unit 28 transmits the file to a destination folder based on FTP via network 21. In addition, when FTP transmission is completed, output unit 28 sends a transmission completion notification to image processor 27.

Job manager 31 is a function unit formed in control unit 20 to manage a job executed by multifunction peripheral 1 and has, for example, the following functions. Upon receipt of a mode change notification indicating a change in the operational status control mode from input-unit controller 32 (described later), job manager 31 stores, in storage unit 26, the changed operational status control mode ("active" or "inactive") indicated in the mode change notification and sends the mode change notification to operational status manager 35 (described later). Upon receipt of a job start notification from input-unit controller 32, job manager 31 sends image scan controller 33 (described later), image processor 27, and the like notifications to start processes necessary to execute the job to be started (called process start notifications). In addition, upon receipt of a discharge notification from image processor 27, job manager 31 sends the discharge notification to authentication device 25.

The process start notification works as follows. When a job to be executed is FTP transmission, job manager 31 sends an image scan start notification to image scan controller 33, operational status manager 35, and input-unit controller 32 for a first-half process of the FTP transmission job. Then, upon receipt of an image scan end notification from image scan controller 33, job manager 31 sends an image scan end notification to operational status manager 35. For a second-half process of the FTP transmission job, an FTP transmission start notification is sent to image processor 27, input-unit controller 32, and operational status manager 35. Then, upon receipt of an FTP transmission end notification from image processor 27, job manager 31 sends a transmission end notification to operational status manager 35 and sends a job end notification to input-unit controller 32.

Further on the process start notification, when a job to be executed is Copy, job manager 31 sends an image scan start notification as in the case of the FTP transmission job for a first-half process of the Copy job. Then, after sending an image scan end notification to operational status manager 35, for a second-half process of the Copy job, job manager 31 sends a print start notification to image processor 27, input-unit controller 32, and operational status manager 35. Then, upon receipt of a print end notification from image processor 27, job manager 31 sends a print end notification to operational status manager 35 and sends a job end notification to input-unit controller 32.

Input-unit controller 32 is a function unit formed in control unit 20 to control a screen displayed on display part 14a of display input unit 14 and the input status of input buttons 14b of display input unit 19. Input-unit controller 32 has, for example, the following functions. Upon receipt of an input lock cancel notification (or an input restriction cancel notification) from panel lock controller 34 (or a panel restriction controller) to hide a panel lock screen (or a panel restriction screen), input-unit controller 32 sends display input unit 19 a panel lock screen hide notification (or a panel restriction screen hide notification) to hide the panel lock screen displayed on display part 14a of display input unit 14. In addition, upon receipt of an input lock notification (or an input restriction notification) to display the panel lock screen from panel lock controller 34, input-unit controller 32 unconditionally sends display input unit 14 a panel lock screen display notification (or a panel restriction screen display notification) to display the panel lock screen if the operational status control mode is "active." If the operational status is "inactive," input-unit controller 32 refers to a display level table in storage unit 26 and compares the display level of the panel lock screen with the display level of a screen currently displayed. Then, input-unit controller 32 sends display input unit 14 a screen display notification which instructs display input unit 14 to display a screen of the higher display level.

Figure 3:
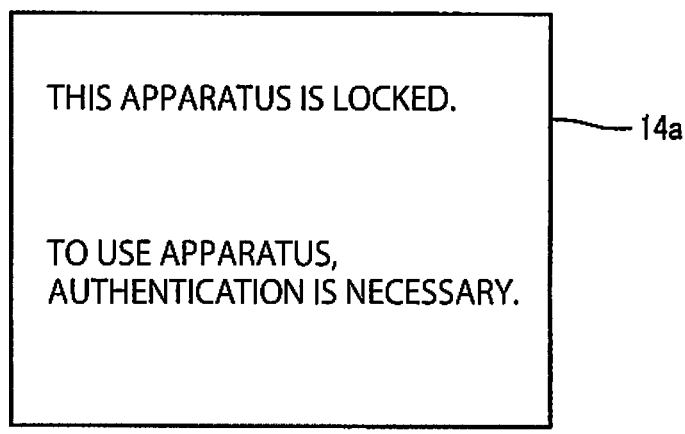
FIG. 3 is an explanatory diagram showing an example of a panel lock screen of Embodiment 1.

As shown in FIG. 3, the panel lock screen is a screen showing a text indicating that multifunction peripheral 1 cannot be used because of it being in an unauthenticated state. While the panel lock screen is displayed on display part 14a of display input unit 14, no instructional input can be made with input buttons 14b.

The display level table is stored in storage unit 26 in advance. As shown in FIG. 4A, a display level is set for every screen displayed on display part 14a of display input unit 14. Specifically, screens showing that a process is being executed, such as a Scanning screen (See FIG. 4B), a Printing screen (See FIG. 4C), and a Processing Data screen, are set to be at a higher level than the panel lock screen. Screens showing that a process is in standby, such as a Copy Standby screen and an Image Scan Standby screen, are set to be at a lower level than the panel lock screen.

Input-unit controller 32 further has the following functions. Upon receipt of a mode change notification from display input unit 14, input-unit controller 32 sends the mode change notification to job manager 31. In addition, upon receipt of a job start notification from display input unit 14 along with setting information on the job, input-unit controller 32 sends the job start notification and the setting information to job manager 31. In addition, upon receipt of a process start notification from job manager 31, input-unit controller 32 sends display input unit 14 a screen display notification to display a screen on display part 14a according to the process start notification.

Screens displayed on display part 14a of display input unit 14 of this embodiment include, besides the panel lock screen, a Set Model screen, a Copy Standby screen, an Image Scan Standby screen, and the like as screens which can be manipulated by a user, and a Scanning screen, a Printing screen, a Processing Data screen, and the like as screens showing that a process is in execution (see FIG. 4A). When the process start notification received from job manager 31 is an image scan start notification for the first-half process of the Copy or FTP transmission job, input-unit controller 32 sends display input unit 14 a Scanning screen display notification to display the Scanning screen. When the process start notification is an FTP transmission start notification for the second-half process of the FTP transmission job, input-unit controller 32 sends display input unit 14 a Processing Data screen display notification to display the Processing Data screen. When the process start notification is a print start notification for the second-half process of the Copy job, input-unit controller 32 sends display input unit 14 a Printing screen display notification to display the Printing screen. In this event, in a case where the panel lock screen is already being displayed, input-unit controller 32 continues to display the panel lock screen if the operational status control mode is "active," or displays a screen of the higher display level based on the above-described display level table if the operational status control mode is "inactive."

In addition, upon receipt of a job end notification from job manager 31, input-unit controller 32 displays a standby screen of the job executed. For example, in a case of FTP transmission, input-unit controller 32 displays the Image Scan Standby screen upon receipt of the job end notification. Further, in a case of Copy, input-unit controller 32 displays the Copy Standby screen upon receipt of the job end notification. In this event, in a case where the panel lock screen is already being displayed when the standby screen is to be displayed, input-unit controller 32 continues to display the panel lock screen unconditionally if the operational status control mode is "active," or input-unit controller 32 displays a screen of the higher display level as a result of a determination based on the above-described display level table if the operational status control mode is "inactive."

Input-unit controller 32 further has, for example, the following functions. Upon every receipt of a press notification for input button 14b from display input unit 14, input-unit controller 32 resets and restarts a panel timer, and sends an input start notification to operational status manager 35 (described later). In addition, upon receipt of a mode change notification indicating a change in the operational status control mode from display input unit 14, input-unit controller 32 sends the mode change notification to job manager 31. In addition, upon expiration of the panel timer by a lapse of a preset time period or upon receipt of a process start notification (e.g., an image scan start notification) from job manager 31, input-unit controller 32 sends operational status manager 35 an input end notification indicating that display input unit 14 is finished being manipulated.

Image scan controller 33 is a function unit formed in control unit 20 to control scanner 17, and has, for example, the following function. Upon receipt of an image scan start notification from job manager 31, image scan controller 34 causes scanner 17 to scan a document set on ADF 15 or contact glass 16. Then, upon completion of the scan, image scan controller 33 sends job manager 31 an image scan end notification along with scanned image data.

Panel lock controller 34 is a function unit formed in control unit 20 to control the panel lock screen displaced on display part 14a of display input unit 14. Panel lock controller 34 has, for example, the following functions. Upon receipt of an input lock cancel notification to hide the panel lock screen from authentication device 25 via FDI 23, panel lock controller 34 sends an input lock cancel notification to input-unit controller 32. In addition, upon receipt of an input lock notification to display the panel lock screen from authentication device 25, panel lock controller 34 stores the input lock notification in storage unit 26 and sends operational status manager 35 (described later) a request to acquire an operational status notification indicating the operational status of multifunction peripheral 1. If the operational status notification acquired from operational status manager 35 is an idle status notification indicating that the operational status of multifunction peripheral 1 is "not in service," panel lock controller 34 immediately sends an input lock notification to input-unit controller 32. If the operational status notification is a busy status notification indicating that the operational status of multifunction peripheral 1 is "in service," panel lock controller 34 performs lock postponement to postpone sending an input lock notification until receipt of an idle status notification. In addition, upon receipt of an idle status notification from operational status manager 35 during the lock postponement, panel lock controller 34 sends an input lock notification to input-unit controller 32.

Operational status manager 35 is a function unit formed in control unit 20 to manage the execution status of a process executed by multifunction peripheral 1 and an input status of input buttons 14b of display input unit 14, and has the following function. Operational status manager 35 sets the execution status of a process of multifunction peripheral 1 to "in execution" or "not in execution" and the input status of display input unit 14 to "being inputted" or "not being inputted." These statuses are stored in storage unit 26 so as to retain the current operational statuses of multifunction peripheral 1. Operational status manager 35 also manages the overall operational status of the multifunction peripheral 1 by updating the operational status notification (a busy status notification or an idle status notification) in storage unit 26.

Specifically, upon receipt of a mode change notification from job manager 31 indicating that the operational status control mode is changed to "inactive," operational status manager 35 sets the execution status of a process to "not in execution" and the input status of display input unit 14 to "not being inputted," and updates the operational status by storing an idle status notification in storage unit 26 as an operational status notification indicating the operational status of multifunction peripheral 1 (simply called an operational status notification below). On the other hand, upon receipt of a mode change notification from job manager 31 indicating that the operational status control mode is changed to "active," operational status manager 35 sets the execution status of a process to "not in execution" and the input status of display input unit 14 to "being inputted" since input button 14b is manipulated to change the setting, and updates the operational status notification to a busy status notification.

Note that if a mode change notification is received indicating that the operating status control mode is changed to "inactive," operational status manager 35 does not update but rather maintains the execution status of a process, the input status, and the operational status notification in storage 26 until receipt of a mode change notification indicating that the operating status control mode is changed to "active."

When the operational status control mode is "active," operational status manager 35 updates the operational statuses and the operational status notification as follows. Specifically, operational status manager 35 updates the execution status of a process to "in execution" upon receipt of a process start notification, such as an image scan start notification, from job manager 31, and operational status manager 35 updates the process execution state to "not in execution" upon receipt of a process end notification, such as an image scan end notification, from job manager 31. Further, operational status manager 35 updates the input status to "being inputted" upon receipt of an input start notification, indicating that display input unit 14 is started being manipulated, from input-unit controller 32, and updates the input status to "not being inputted" upon receipt of an input end notification, indicating that display input unit 14 is finished being manipulated, from input-unit controller 32.

Operational status manager 35 also has the following functions. Operational status manager 35 determines the operational status of multifunction peripheral 1 upon receipt of a process started or end notification from job manager 31 to update the execution status of a process, or upon receipt of an input start or end notification from input-unit controller 32 to update the input status. Operational status manager updates an operational status notification based on a result of the operational status determination, and transmits an operational state notification (an in-service notification or an out-of-service notification) to authentication device 25 via FDI 23.

In this operational status determination, when the process execution state and the operation state of display input unit 14, which are currently stored in storage unit 26, are "not in execution" and "not being inputted," respectively, operational status manager 35 determines that multifunction peripheral 1 is not in service. Then, operational status manager 35 updates the operational status notification to an idle status notification, and transmits an OUT-OF-SERVICE notification to authentication device 25.

On the other hand, when the current process execution state is "in execution" and/or the current operation state is "being inputted," operational status manager 35 determines that multifunction peripheral 1 is in service. Then, operational status manager 35 updates the operational status notification to a busy status notification, and transmits a busy STATUS NOTIFICATION to authentication device 25.

Further, when the operational status notification is updated to an idle status notification, operational status manager 35 sends panel lock controller 34 an idle status notification indicating that the operational status of multifunction peripheral 1 is "not in service."

When the operational status control mode is "inactive," operational status manager 35 determines that the operational status is in an out-of-service state. Hence, operational status manager 35 always sends an idle status notification to panel lock controller 34 and always transmits an out-of-service notification to authentication device 25.

Operational status manager 35 further has, for example, the following function. Upon receipt of a request to acquire the operational status of multifunction peripheral 1 from panel lock controller 34, operational status manager 35 sends panel lock controller 34 the operational status notification stored in storage unit 26 at the time of receipt of the request.

IC card reader 24, described above as an authentication information reader, has the following function. When a user holds his or her card over IC card reader 24, IC card reader 24 reads authentication information which is stored in advance in an IC chip in the card and which includes a personal identification number (PIN) of the user and other information.

Authentication server 22 stores therein in advance: a period of validity for one-time authentication; a registered user table in which PINs of users are registered; and upper use limits for the respective PINs.

The period of validity in this embodiment is set so as to correspond to a time period spent from receipt of authentication information from authentication device 25 until a first process (e.g., an image scan process) executed by multifunction peripheral 1 is ended.

The upper use limit is set for each user and is a value calculated by converting the number of copies permitted to the user into an amount of money. Authentication server 22 stores therein a cost for making a single copy (called a unit cost) calculated by considering the cost of a sheet and the cost of ink for the copy. In this embodiment, no upper use limit is set for FTP transmission.

Authentication server 22 is connected to authentication device 25 via network 21, and has, for example, the following functions. Authentication server 22 reads the PIN of a user from authentication information received from authentication device 25 and checks whether the PIN is registered in the registered user table or not to determine if the owner of the card should be authenticated as a user or not. The authentication server 22 transmits the result of the authentication to authentication device 25 via network 21, with the authentication result indicating a successful authentication when the PIN is registered in the registered user table and indicating a failed authentication when the PIN is not registered in the registered user table. In addition, when a time period has elapsed since the successful authentication reaches the period of validity, authentication server 22 transmits a notification of expiration of authentication due to timeout (called an authentication timeout notification) to authentication device 25. In addition, upon receipt of a discharge notification from authentication device 25 during execution of a job (a Copy job in this embodiment) instructed by the authenticated user, authentication server 22 updates the upper use limit set for the user. When there is an insufficient balance, authentication server 22 transmits a notification of expiration of authentication due to insufficient balance (called an insufficient balance notification) to authentication device 25.

Authentication device 25 is connected to authentication server 22 via network 21 and controls unit 20 of multifunction peripheral 1 via FDI, and has, for example, the following functions. Upon acquisition of authentication information from IC card reader 24, authentication device 25 transmits the acquired authentication information to authentication server 22. In addition, upon receipt of an authentication result from authentication server 22, authentication device 25 transmits an input lock cancel notification to hide the panel lock screen to panel lock controller 34 of control unit 20 of multifunction peripheral 1 if the authentication result indicates a successful authentication, or displays a text indicating failure of authentication on a display screen (not shown) of authentication device 25 if the authentication result indicates failed authentication. In addition, upon receipt of an authentication timeout notification from authentication server 22, authentication device 25 immediately transmits an input lock notification to display the panel lock screen to panel lock controller 34 if having received an out-of-service notification from operational status manager 35 of control unit 20, or performs a lock postponement to postpone transmitting the input lock notification until receipt of an out-of-service notification if having received a busy status notification. In addition, upon receipt of an out-of-service notification from operational status manager 35 during the lock postponement, authentication device 25 transmits an input lock notification to panel lock controller 34. In addition, upon receipt of a discharge notification from job manager 31, authentication device 25 transmits the discharge notification to authentication server 22. In addition, upon receipt of an insufficient balance notification from authentication server 22, authentication device 25 immediately transmits an input lock notification to panel lock controller 34, irrespective of the operational status notification received from operational status manager 35.

During-process screens of this embodiment are screens showing the progress of a process, and include the following texts for example: "Scanning X-th Sheet" in the Scanning screen, "Printing X-th Sheet" in the Printing screen, and "Preparing Transmission Data" in the Processing Data screen.

The Copy Standby screen allows various settings regarding Copy (such as sheet size, copy intensity, scale, and black-and-white print), and the Image Scan Standby screen allows various settings regarding FTP transmission (such as the format of a transmission file and designation of a folder to which the file is to be transmitted).

Operation of multifunction peripheral 1, authentication server 22, and authentication device 25 having the above configurations is described below.

Figure 5:
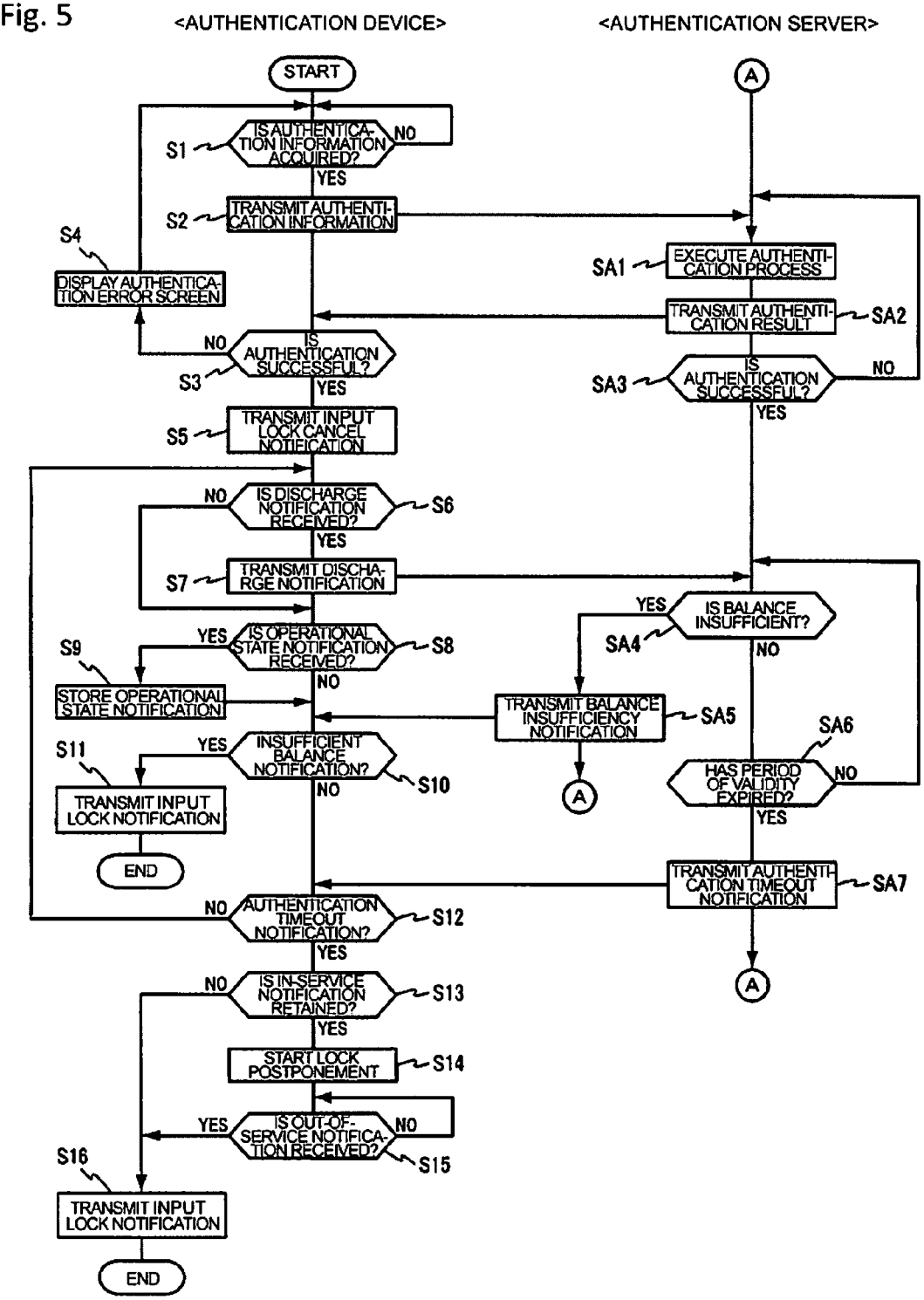
FIG. 5 is a flowchart showing the operation of an authentication device and an authentication server of Embodiment 1.

First, operation of authentication device 25 and authentication server 22 of this embodiment is described using the flowchart shown in FIG. 5. Note that S is a step performed by authentication device 25, and SA is a step performed by authentication server 22.

To use multifunction peripheral 1 of this embodiment, a user needs to be authenticated by holding a card, in which authentication information such as a PIN of the user is stored, over IC card reader 24 connected to authentication device 25.

Authentication device 25 of this embodiment has a function of being constantly aware of the operational status of multifunction peripheral 1 by storing, in a memory (not shown), an in-service notification or an out-of-service notification transmitted from operational status manager 35 of multifunction peripheral 1 via FDI 23 and by retaining the notification.

S1: Authentication device 25 monitors the output from IC card reader 24. When recognizing that authentication information in the card of the user is outputted from IC card reader 24, authentication device 25 acquires the authentication information. Then, the operation proceeds to Step S2. If no authentication information is outputted from IC card reader 24, authentication apparatus 25 continues the monitoring.

S2: Upon acquisition of the authentication information, authentication device 25 transmits the authentication information to authentication server 22 (Step SA1) via network 21.

SA1: Authentication server 22 is standing by waiting to receive authentication information from authentication device 25. Then, upon receipt of authentication information, authentication server 22 executes an authentication process. If not receiving authentication information, authentication server 22 continues to stand by.

The authentication process of this embodiment is to read the PIN of the user from the received authentication information and to determine whether the PIN is registered in the registered user table or not. Then, the operation proceeds to Step SA2.

SA2: If the PIN is registered in the registered user table, authentication server 22 authenticates the owner of the card as a user and generates an authentication result indicating a successful authentication. If the PIN is not registered in the registered user table, authentication server 22 generates an authentication result indicating a failed authentication. Authentication server 22 then transmits the authentication result to authentication device 25 (Step S3) via network 21. The operation then proceeds to Step SA3.

SA3: If the authentication result transmitted from authentication server 22 to authentication device 25 indicates a failed authentication, the operation returns to SA1 where authentication server 22 stands by waiting to receive authentication information from authentication device 25. If the authentication result indicates a successful authentication, authentication server 22 uses its timer function to start timing a time period elapsed since the successful authentication. Then, the operation proceeds to Step SA4 where authentication server 22 starts monitoring in the following steps.

SA4: Authentication server 22 monitors for receipt of a discharge notification from authentication device 25 (Step S7). Upon receipt of the discharge notification, authentication server 22 subtracts a unit cost from the upper use limit set for the PIN read from the authentication information, and updates the upper use limit. The operation proceeds to SA5 if the balance is insufficient, or proceeds to Step SA6 if there is still some balance left.

SA5: Upon determination that the balance for the PIN is insufficient, authentication server 22 transmits an insufficient balance notification to authentication device 25 (Step S10). Then, via connector A, the operation returns to Step SA1 where authentication server 22 stands by waiting to receive authentication information from authentication device 25.

SA6: Authentication server 22 monitors the elapsed time period having been timed since Step SA3 above. When the elapsed time period reaches the period of validity, the operation proceeds to Step SA7. If the elapsed time period is shorter than the period of validity, the operation returns to Step SA4 where authentication server 22 continues the monitoring in Steps SA4 and SA6.

SA7: Upon a determination that the period of validity has expired because the elapsed time period has reached the period of validity, authentication server 22 transmits, to authentication device 25 (Step 12), an authentication timeout notification indicating that the period of validity for a one-time authentication has expired. Then, via connector A, the operation returns to Step SA1 where authentication server 22 stands by waiting to receive authentication information from authentication device 25.

S3: Meanwhile, since the transmission of the authentication information, authentication device 25 has been standing by waiting to receive an authentication result from authentication server 22 (Step SA2). Then, upon receipt of an authentication result from authentication server 22, authentication device 25 recognizes a successful authentication of the user if the authentication result indicates a successful authentication, and then the operation proceeds to Step S5. If the authentication result indicates a failed authentication, the operation proceeds to Step S4. If not receiving the authentication result, authentication device 25 continues to stand by waiting to receive an authentication result of authentication server 22.

S4: After recognizing that the authentication result indicates a failed authentication, authentication device 25 displays a screen with a text indicating a failed authentication on its display screen, and hides the screen after a lapse of a predetermined time period. Then, the operation returns to Step S1 where authentication device 25 stands by monitoring the output from IC card reader 24.

S5: After recognizing a successful authentication of the user, authentication device 25 transmits an input lock cancel notification to panel lock controller 34 of control unit 20 of multifunction peripheral 1 via FDI 23 in order to hide the panel lock screen displayed on display part 14a of display input unit 14 of multifunction peripheral 1. Then, authentication device 25 starts monitoring in the following steps.

S6: Authentication device 25 monitors for receipt of a discharge notification transmitted from job manager 31 of control unit 20 via FDI 23. If authentication device 25 receives a discharge notification, the operation proceeds to Step S7. If authentication device 25 does not receive a discharge notification, the operation proceeds to Step S8.

S7: Upon receipt of the discharge notification, authentication device 25 transmits the discharge notification to authentication server 22 (Step SA4) via network 21, and the operation proceeds to Step S8.

S8: Authentication device 25 monitors for receipt of an operational state notification (an in-service notification or an out-of-service notification) transmitted from operational status manager 35 of control unit 20. The operation proceeds to Step S9 if authentication device 25 receives an operational state notification, or proceeds to Step S10 if authentication device 25 does not receive an operational state notification.

S9: Upon receipt of the operational state notification, authentication device 25 stores the operational state notification in a memory (not shown) to retain the operational state of multifunction peripheral 1, and the operation proceeds to Step S10.

S10: Authentication device 25 monitors for receipt of an insufficient balance notification from authentication server 22. The operation proceeds to Step S11 if authentication device 25 receives an insufficient balance notification, or proceeds to Step S12 if authentication device 25 does not receive an insufficient balance notification.

S11: Upon receipt of the insufficient balance notification, in order to display the panel lock screen on display part 14a of display input unit 14 of multifunction peripheral 1, authentication device 25 transmits an input lock notification to panel lock controller 34 of control unit 20, irrespective of the operational state of multifunction peripheral 1 which it retains. Then, the operation returns to Step S1 where authentication device 25 stands by monitoring the output from IC card reader 24.

S12: Authentication device 25 monitors for receipt of an authentication timeout notification from authentication server 22. If authentication device 25 receives an authentication timeout notification, the operation proceeds to Step S13. If authentication device 25 does not receive an authentication timeout notification, the operation returns to Step S6 from which authentication device 25 continues the monitoring in Steps S6, S8, S10, and S12.

S13: Upon receipt of the authentication timeout notification, authentication device 25 checks the operational state notification transmitted from multifunction peripheral 1 and retained by authentication device 25. The operation proceeds to Step S14 if the operational state notification is an in-service notification, or proceeds to Step S16 if the operational state notification is an out-of-service notification.

S14: Upon recognition that the retained operational state notification is an in-service notification, authentication device 25 starts lock postponement to postpone transmitting an input lock notification, and the operation proceeds to Step S15.

S15: After starting the lock postponement, authentication device 25 stands by waiting to receive an out-of-service notification by the monitoring performed since Step S8 above. Upon receipt of an out-of-service notification from operational status manager 35, authentication device 25 cancels the lock postponement, and the operation proceeds to Step S16. If not receiving an out-of-service notification, authentication device 25 continues to stand by.

S16: Upon cancellation of the lock postponement after receiving the authentication timeout notification and recognizing that the operational state of multifunction peripheral 1 is "out of service," authentication device 25 transmits an input lock notification to panel lock controller 34 of control unit 20 to display the panel lock screen on multifunction peripheral 1. Then, the operation returns to Step S1 where authentication device 25 stands by monitoring the output from IC card reader 24.

Note that the operation of authentication device 25 and authentication server 22 is repeated until they are powered off.

By using the flowchart in FIG. 6 and following the steps denoted by SB, a description is given below of the operation for the screen display notification performed by control unit 20 of multifunction peripheral 1 of this embodiment.

SB1: In control unit 20 of multifunction peripheral 1, panel lock controller 34 stands by waiting to receive an input lock cancel notification transmitted from authentication device 25 (Step S5) via FDI 23. Upon receipt of the input lock cancel notification, panel lock controller 34 sends an input lock cancel notification to input-unit controller 32. Then, the operation proceeds to Step SB2. If panel lock controller 34 does not receive an input lock cancel notification, the operation proceeds to Step SB3.

SB2: In control unit 20, upon receipt of the input lock cancel notification, input-unit controller 32 sends display input unit 14 a panel lock screen hide notification to hide the panel lock screen (see FIG. 3) displayed on display part 14a of display input unit 14 and a Copy Standby screen display notification to display a Copy Standby screen which is an initial screen. Display input unit 14 then hides the panel lock screen on display part 14a and switches it to the Copy Standby screen.

SB3: In control unit 20, panel lock controller 34 stands by waiting to receive an input lock notification from authentication device 25 (Steps S11 and S16). Upon receipt of an input lock notification, panel lock controller 34 stores the received input lock notification in storage unit 26, and the operation proceeds to Step SB4. If panel lock controller 34 does not receive an input lock notification, the operation proceeds to Step SB12.

SB4: In control unit 20, upon receipt of the input lock notification, panel lock controller 34 sends operational status manager 35 a request to acquire an operational status notification indicating the operational status of multifunction peripheral 1. If the operational status notification acquired from operational status manager 35 (SC2 in FIG. 7) is an idle status notification, the operation proceeds to Step SB7. If the operational status notification is a busy status notification, the operation proceeds to Step SB5.

When the operational status control mode is "inactive," the operational status notification acquired from operational status manager 35 is always a non-busy status notification, and therefore the operation always proceeds to Step SB7.

SB5: In control unit 20, upon acquisition of the busy status notification, panel lock controller 34 starts lock postponement to postpone sending an input lock notification, and the operation proceeds to Step SB6.

SB6: In control unit 20, after starting the lock postponement, panel lock controller 34 stands by waiting for a non-busy status notification from operational status manager 35 (SC21 in FIG. 7) as the operational status notification. Upon receipt of an idle status notification from operational status manager 35, panel lock controller 34 cancels the lock postponement, and the operation proceeds to Step SB7. If not receiving a non-busy status notification, panel lock controller 34 continues to stand by.

SB7: In control unit 20, upon recognition that the process execution status is "in execution," or upon cancellation of the lock postponement in response to the idle status notification, panel lock controller 34 sends input-unit controller 32 an input lock notification.

SB8: In control unit 20, upon receipt of the input lock notification, input-unit controller 32 checks the current operational status control mode stored in storage unit 26. If the operational status control mode is "inactive," the operation proceeds to Step SB9. If the operational status control mode is "active," input-unit controller 32 determines that the panel lock screen should be displayed, and the operation proceeds to Step SB11.

SB9: In control unit 20, upon recognition that the operational status control mode is "inactive," input-unit controller 32 refers to the display level table (see FIG. 4A) in storage unit 26 and compares the display level of the panel lock screen with the display level of the currently-displayed screen. When the display level of the current screen is higher than that of the panel lock screen, input-unit controller 32 determines that the current screen should continue to be displayed, and the operation proceeds to Step SB10. When the display level of the current screen is lower than that of the panel lock screen, input-unit controller 32 determines that the panel lock screen should be displayed, and the operation proceeds to Step SB11.

For instance, in a case where the Scanning screen (the display level of which is 150) is currently displayed on display part 14a, since the display level of the Scanning screen is higher than that of the panel lock screen (the display level of which is 100), the Scanning screen is displayed. Moreover, in the case where the Copy Standby screen (the display level of which is 50) is currently displayed on display part 14a, since the panel lock screen (the display level of which is 100) has a higher display level, the panel lock display is displayed.

SB10: In control unit 20, if determining that the current screen should continue to be displayed, input-unit controller 32 does not send display input unit 14 a screen display notification so as to continue displaying the current screen, and the operation proceeds to Step SB12.

SB11: In control unit 20, if determining that the panel lock screen should be displayed, input-unit controller 32 sends display input unit 14 a panel lock screen display notification to display the panel lock screen, and the operation proceeds to Step SB12. Display input unit 14 then switches the screen on display part 14a to the panel lock screen.

SB12: In control unit 20, input-unit controller 32 stands by waiting for a process start notification from job manager 31. If input-unit controller 32 receives a process start notification from job manager 31, the operation proceeds to Step SB13. If input-unit controller 32 does not receive a process start notification from job manager 31, the operation returns to Step SB1 to continue to stand by in Steps SB1, SB3, and SB12.

SB13: In control unit 20, upon receipt of the process start notification, if input-unit controller 32 recognizes that the panel lock screen is displayed on display part 14a of display input unit 14, the operation proceeds to Step SB15. If input-unit controller 32 recognizes that the panel lock screen is not displayed, the operation proceeds to Step SB14.

SB14: In control unit 20, upon a recognition that the panel lock screen is not displayed, input-unit controller 32 determines that the panel lock screen needs to be displayed if an input lock notification has been received from authentication device 25 and is stored in storage unit 26. Then, the operation proceeds to Step SB15. If no input lock notification has been received from authentication device 25 and is therefore not stored in storage unit 26, input-unit controller 32 determines that the screen should be switched to the next screen to be displayed. Then, the operation proceeds to Step SB17.

SB15: In control unit 20, upon a recognition that the panel lock screen is displayed, or a determination being made that the panel lock screen needs to be displayed, input-unit controller 32 checks the operational status control mode currently stored in storage unit 26. Then, if the operational status control mode is "active," input-unit controller 32 determines that the panel lock screen should be displayed, and the operation proceeds to Step SB18. If the operational status control mode is "inactive," the operation proceeds to Step SB16.

SB16: In control unit 20, upon a recognition that the operational status control mode is "inactive," input-unit controller 32 refers to the display level table in storage unit 26 and compares the display level of the panel lock screen with the display level of the next screen. When the display level of the next screen is higher than that of the panel lock screen, input-unit controller 32 determines that the screen should be switched to the next screen, and the operation proceeds to Step SB17. When the display level of the next screen is lower than that of the panel lock screen, input-unit controller 32 determines that the panel lock screen should continue to be displayed, and the operation proceeds to Step SB18.

For instance, in the case where the Printing screen (the display level of which is 150) is to be displayed next on display part 14a, since the display level of the Printing screen is higher than that of the panel lock screen (the display level of which is 100), the Printing screen is displayed. Moreover, in the case where the Copy Standby screen (the display level of which is 50) is to be displayed next on display part 14a, since the panel lock screen (the display level of which is 100) has a higher display level, the panel lock display is displayed.

SB17: In control unit 20, upon a determination that the screen should be switched to the next screen, input-unit controller 32 sends display input unit 14 a next screen display notification (e.g., a Printing screen display notification) to display the next screen. Then, the operation returns to Step SB1, and control unit 20 continues standing by in Steps SB1, SB3, and SB12. Upon receipt of the next screen display notification, display input unit 14 switches the screen on display part 14a to the next screen as notified.

SB18: In control unit 20, upon a determination that the panel lock screen should be displayed, input-unit controller 32 sends display input unit 14 a panel lock screen display notification to display the panel lock screen. Then, the operation returns to Step SB1, and control unit 20 continues standing by in Steps SB1, SB3, and SB12. Upon receipt of the panel lock screen display notification, display input unit 14 switches the screen on display part 14a to the panel lock screen.

If the panel lock screen is already displayed on display part 14 an input-unit controller 32 does not send display input unit 14 the panel lock screen display notification so that the panel lock screen may continue to be displayed. Then, the operation returns to Step SB1, and control unit 20 continues standing by in Steps SB1, SB3, and SB12.

In this way, in the operation for screen display notifications of this embodiment, if the operational status control mode is "inactive," to display the panel lock screen, control unit 20 compares the display level of the next screen and that of the panel lock screen, and displays the screen of the higher display level.

To display the next screen, if the panel lock screen is currently displayed and the operating status control mode is "inactive," control unit 20 compares the display level of the panel lock screen and that of the next screen, and displays the screen of the higher display level.

If the operational status control mode is "active," the lock postponement causes the current screen to continue to be displayed until the process in execution is ended, irrespective of whether an input lock notification has been received or not. Then, after the process is ended, the panel lock screen is displayed.

Authentication device 25 of this embodiment has a lock postponement function to postpone transmitting an input lock notification, depending on the operational state notification received, when the operational status control mode is "active." When the lock postponement is performed, authentication device 25 transmits the input lock notification (S16 in FIG. 5) after the lock postponement is canceled in response to an out-of-service notification from operational status manager 35. Since the operational status notification in multifunction peripheral 1 at this time is an idle status notification, the panel lock screen is displayed after the during-process screen currently displayed (NO in SB9→SB7→NO in SB8→SB11).

Further, there is a case where, when the operational status control mode is "inactive," authentication device 25 immediately transmits an input lock notification due to an insufficient balance (S11 in FIG. 5) without performing lock postponement, and multifunction peripheral 1 receives the input lock notification in the middle of executing a process. Since the operational status notification in this case is a busy status notification, the lock postponement is performed on the multifunction peripheral 1 side. Thus, as in the above case, the panel lock screen is displayed after the Processing screen currently displayed (YES in SB4→SB5→YES in SB6→SB7→NO in SB8→SB11). This is useful particularly when multifunction peripheral 1 of this embodiment is connected to authentication device 25 with no lock postponement function.

Note that the operation for screen display notifications is repeated until multifunction peripheral 1 is powered off.

By using a flowchart shown in FIG. 7 and following steps denoted by SC, a description is given below of the operation for an operational status notification performed by control unit 20 of multifunction peripheral 1 of this embodiment.

SC1: In control unit 20, operational status manager 35 stands by waiting for an operational status acquisition request from panel lock controller 34 (SB4 in FIG. 6). If operational status manager 35 receives an operational status acquisition request from panel lock controller 34, the operation proceeds to Step SC2. If operational status manager 35 does not receive an operational status acquisition request, the operation proceeds to Step SC3.

SC2: In control unit 20, upon receipt of the operational status acquisition request, operational status manager 35 reads an operational status notification (a busy status notification or an idle status notification) stored in storage unit 26, and sends the operational status notification to panel lock controller 34. Then, the operation returns to Step SC1 where operational status manager 35 continues standing by in Step SC1 and standing by in Step SC3, SC7, SC10, SC13, and SC16 described below.

SC3: In control unit 20, operational status manager 35 stands by waiting for a mode change notification from job manager 31, the notification indicating a change in the operational status control mode. If operational status manager 35 receives a mode change notification from job manager 31, the operation proceeds to Step SC4. If operational status manager 35 does not receive a mode change notification, the operation proceeds to Step SC7.

The setting of the operational status control mode here is changed as follows. Specifically, an administrator, with the intent to change the setting of the operational status control mode, holds his or her own card over IC card reader 24. Then, authentication device 25 authenticates the administrator as in the case of authenticating users described earlier, and transmits an input lock cancel notification to multifunction peripheral 1.

Figure 6:
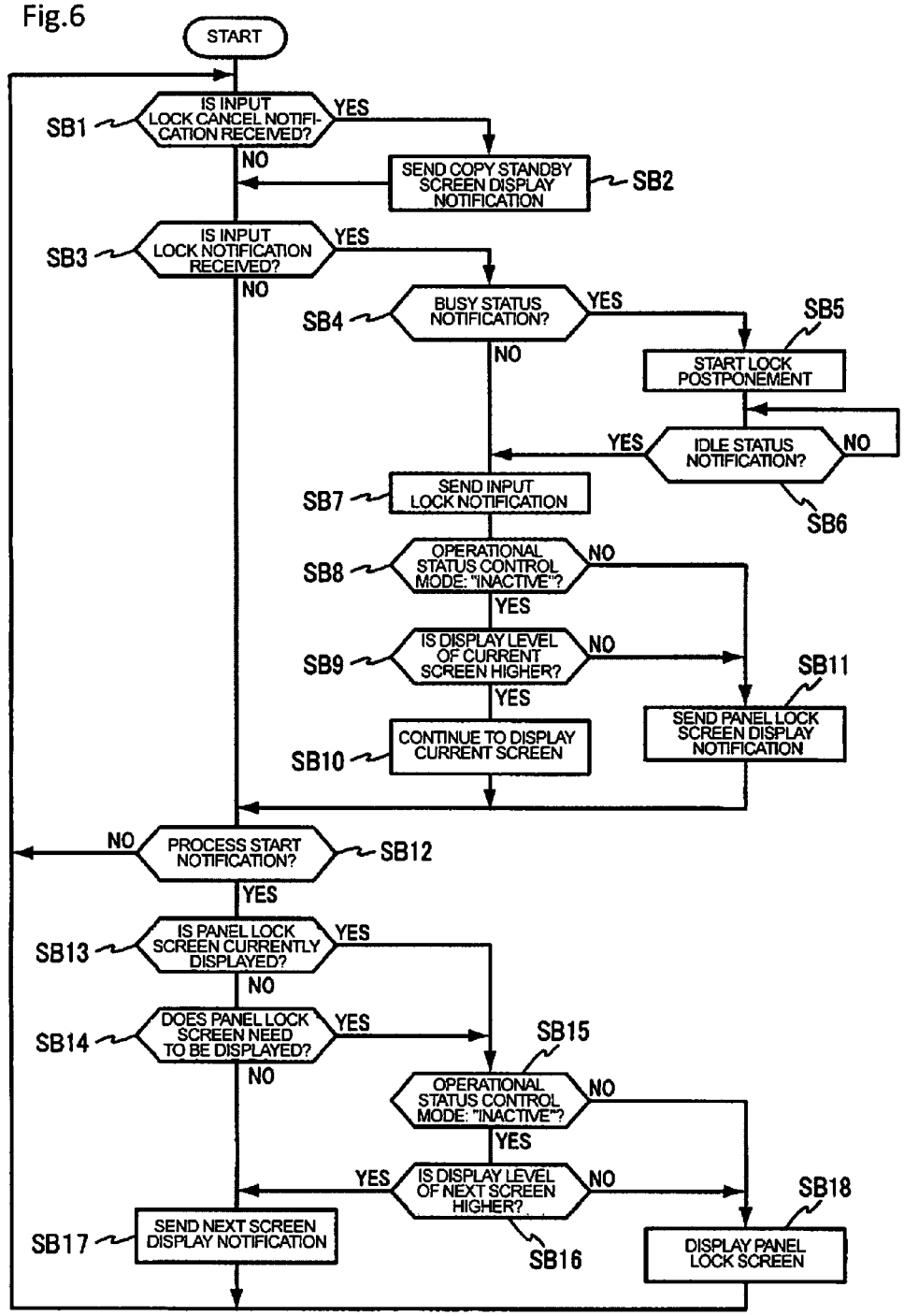
FIG. 6 is a flowchart showing the operation for screen display notification performed by the multifunction peripheral of Embodiment 1.
Figure 8:
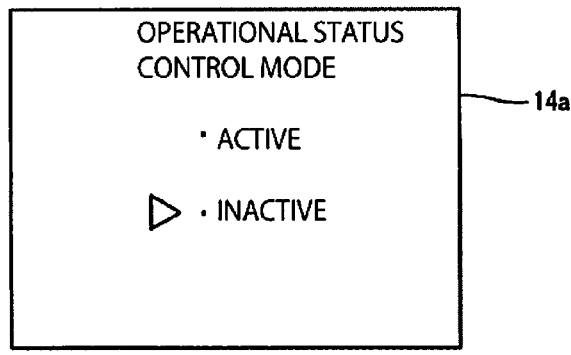
FIG. 8 is an explanatory diagram showing an example of a Set Mode screen for setting an operational status control mode of Embodiment 1.

Upon receipt of the input lock cancel notification, multifunction peripheral 1 switches the panel lock screen to the Copy Standby screen by Steps SB1 and SB2 in FIG. 6. When the administrator presses input button 14b to instruct a mode setting change, a password entry screen is displayed on display part 14a, and the administrator then enters a password using input buttons 14b. If the password is verified, the Set Mode screen shown in FIG. 8 is displayed on display part 14a. The Set Mode screen includes, for example, settable modes ("active" and "inactive") and a mark for indicating the selection.

When the administrator designates the operational status control mode to be set by using input buttons 14b, display input unit 14 accepts the setting change, and sends a mode change notification to input-unit controller 32 of control unit 20. Input-unit controller 32 sends the mode change notification to job manager 31. Job manager 31 then stores, in storage unit 26, the operational status control mode ("active" or "inactive") indicated in the mode change notification, and also sends the mode change notification to operational status manager 35 (Step SC3).

When the administrator thereafter presses input button 14b to end the setting, the Copy Standby screen is displayed on display part 14a.

SC4: In control unit 20, upon receipt of the mode change notification, operational status manager 35 checks the current operational status control mode stored in storage unit 26. When the operational status control mode is "active," the operation proceeds to Step SC5. If the operational status control mode is "inactive," the operation proceeds to Step SC6.

SC5: In control unit 20, upon a recognition that the operational status control mode is "active," operational status manager 35 updates the operational statuses and the operational status notification in storage unit 26 as follows: the process execution status is updated to "not in execution," the input status of display input unit 14 is updated to "being inputted," and the operational status notification is updated to a busy status notification. Then, the operation proceeds to Step SC7.

SC6: In control unit 20, upon a recognition that the operational status control mode is "inactive," operational status manager 35 updates the operational statuses and the operational status notification in storage unit 26 as follows: the process execution status is updated to "not in execution," the input status of display input unit 14 is updated to "not being inputted," and the operational status notification is updated to an idle status notification. Then, the operation proceeds to Step SC7.

SC7: In control unit 20, operational status manager 35 stands by waiting for an input start notification sent from input-unit controller 32 upon every pressing of input button 14b (SD3 in FIG. 9). If operational status manager 35 receives an input start notification from input-unit controller 32, the operation proceeds to Step SC8. If operational status manager 35 does not receive an input start notification from input-unit controller 32, the operation proceeds to Step SC10.

SC8: In control unit 20, upon receipt of the input start notification, operational status manager 35 checks the current operational status control mode stored in storage unit 26. If the operational status control mode is "active," the operation proceeds to Step SC9. If the operational status control mode is "inactive," the operation proceeds to Step SC10 without operational status manager 35 updating the input status.

SC9: In control unit 20, upon a recognition that the operational status control mode is "active," operational status manager 35 updates the input status of display input unit 14 stored in storage unit 26 to "being inputted." Then, the operation proceeds to Step SC10.

SC10: In control unit 20, operational status manager 35 stands by waiting for an input end notification from input-unit controller 32 (SD5 in FIG. 9). If operational status manager receives an input end notification from input-unit controller 32, the operation proceeds to Step SC11. If operational status manager 35 does not receive an input end notification from input-unit controller 32, the operation proceeds to Step SC13.

SC11: In control unit 20, upon receipt of the input end notification, operational status manager 35 checks the current operational status control mode stored in storage unit 26. If the operational status control mode is "active," the operation proceeds to Step SC12. If the operational status control mode is "inactive," the operation proceeds to Step SC13 without operational status manager 35 updating the input status.

SC12: In control unit 20, upon recognition that the operational status control mode is "active," operational status manager 35 updates the input status of display input unit 14 stored in storage unit 26 to "not being inputted." Then, the operation proceeds to Step SC13.

SC13: In control unit 20, operational status manager 35 stands by waiting for a process start notification from job manager 31. If operational status manager 35 receives a process start notification from job manager 31, the operation proceeds to Step SC14. If operational status manager 35 does not receive a process start notification from job manager 31, the operation proceeds to Step SC16.

SC14: In control unit 20, upon receipt of the process start notification, operational status manager 35 checks the current operational status control mode stored in storage unit 26. If the operational status control mode is "active," the operation proceeds to Step SC15. If the operational status control mode is "inactive," the operation proceeds to Step SC16 without operational status manager 35 updating the execution status.

SC15: In control unit 20, upon a recognition that the operational status control mode is "active," operational status manager 35 updates the operational statuses in storage unit 26 as follows: the process execution status is updated to "in execution" and the input status is updated to "not being inputted." The operation then proceeds to Step SC16.

SC16: In control unit 20, operational status manager 35 stands by waiting for a process end notification from job manager 31. If operational status manager 35 receives a process end notification from job manager 31, the operation proceeds to Step SC17. If operational status manager 35 does not receive a process end notification, the operation proceeds to Step SC19.

SC17: In control unit 20, upon receipt of the process end notification, operational status manager 35 checks the current operational status control mode stored in storage unit 26. If the operational status control mode is "active," the operation proceeds to Step SC18. If the operational status control mode is "inactive," the operation proceeds to Step SC19 without operational status manager 35 updating the execution status.

SC18: In control unit 20, upon a recognition that the operational status control mode is "active," operational status manager 35 updates the process execution status stored in storage unit 26 to "not in execution." The operation then proceeds to Step SC19.

SC19: In control unit 20, after updating the operational statuses of multifunction peripheral 1, operational status manager 35 performs an operational status determination. Specifically, operational status manager 35 reads the current execution status stored in storage unit 26, and the operation proceeds to Step SC22 if the execution status is "in execution," or proceeds to Step SC20 if the execution status is "not in execution."

SC20: Upon recognition that the execution status is "not in execution," operational status manager 35 reads the current input status stored in storage unit 26. If the input status is "being inputted," the operation proceeds to Step SC22. If the input status is "not being inputted," the operation proceeds to Step SC21.

SC21: Upon a recognition that the execution status and the input status are "not in execution" and "not being inputted," respectively, operational status manager 35 determines that multifunction peripheral 1 is not in service, and updates the operational status notification in storage unit 26 to an idle status notification. Then, operational status manager 35 sends the idle status notification to panel lock controller 34 and transmits an out-of-service notification to authentication device 25 (S8 in FIG. 5) via FDI 23. The operation returns to Step SC1 from which operational status manager 35 continues to stand by in Steps SC1, SC3, SC7, SC10, SC13, and SC16.

SC22: Upon recognition that the execution status is "in execution" or that the input status is "being inputted," operational status manager 35 determines that multifunction peripheral 1 is in service and updates the operational status notification in storage unit 26 to a busy status notification. Then, operational status manager 35 sends the busy status notification to panel lock controller 34 and transmits an in-service notification to authentication device 25 (S8 in FIG. 5) via FDI 23. Then, the operation returns to Step SC1 from which operational status manager 35 continues to stand by in Steps SC1, SC3, SC7, SC10, SC13, and SC16.

In this way, in this embodiment, if the operational status control mode is "active" and if the current execution status and input status stored in storage unit 26 are "not in execution" and "not being inputted," respectively, an idle status notification is sent to panel lock controller 34, and an out-of-service notification is transmitted to authentication device 25.

Further, if the execution status is "in execution" or if the input status is "being inputted," a busy status notification is sent to panel lock controller 34, and an in-service notification is transmitted to authentication device 25.

Further, if the operational status control mode is "inactive," the execution status ("not in execution") and the input status ("not being inputted") stored in storage unit 26 at the time of the mode setting are maintained. Thus, an idle status notification is always sent to panel lock controller 34, and an out-of-service notification is always transmitted to authentication device 25.

Note that the operation for operational status notification is repeated until multifunction peripheral 1 is powered off.

By using the flowchart in FIG. 9 and following the steps denoted by SD, a description is given below of the operation for input status notification performed by control unit 20 of multifunction peripheral 1 of this embodiment.

SD1: In control unit 20, input-unit controller 32 stands by waiting for a press notification sent from display input unit 14 upon every pressing of input button 14b. If input-unit controller 32 receives a press notification from display input unit 14, the operation proceeds to Step SD2. If input-unit controller 32 does not receive a press notification, the operation proceeds to Step SD4.

SD2: In control unit 20, upon receipt of the press notification, input-unit controller 32 resets a panel timer to start timing a new elapsed time period, and the operation proceeds to Step SD3.

SD3: In control unit 20, after starting the timing of the new elapsed time period, input-unit controller 32 sends an input start notification to operational status manager 35 (SC7 in FIG. 7), and the operation proceeds to Step SD4.

SD4: In control unit 20, input-unit controller 32 stands by waiting for the lapse of a predetermined time period with the panel timer timing the elapsed time period. If the elapsed time period reaches the predetermined time period, input-unit controller 32 determines that the panel timer has expired, and the operation proceeds to Step SD5. If the elapsed time period has yet to reach the predetermined time period, the operation returns to Step SD1 from which input-unit controller 32 continues standing by in Steps SD1 and SD4.

SD5: In control unit 20, after the determination that the panel timer has expired, input-unit controller 32 sends an input end notification to operational status manager 35 (SC10 in FIG. 7). Then, the operation returns to Step SD1 from which input-unit controller 32 continues standing by in Steps SD1 and SD4.

This operation for operational status notification is repeated until multifunction peripheral 1 is powered off.

A description is given below of the operation performed by multifunction peripheral 1 of this embodiment when a user uses multifunction peripheral 1 to perform Copy or FTP transmission.

Figure 10:
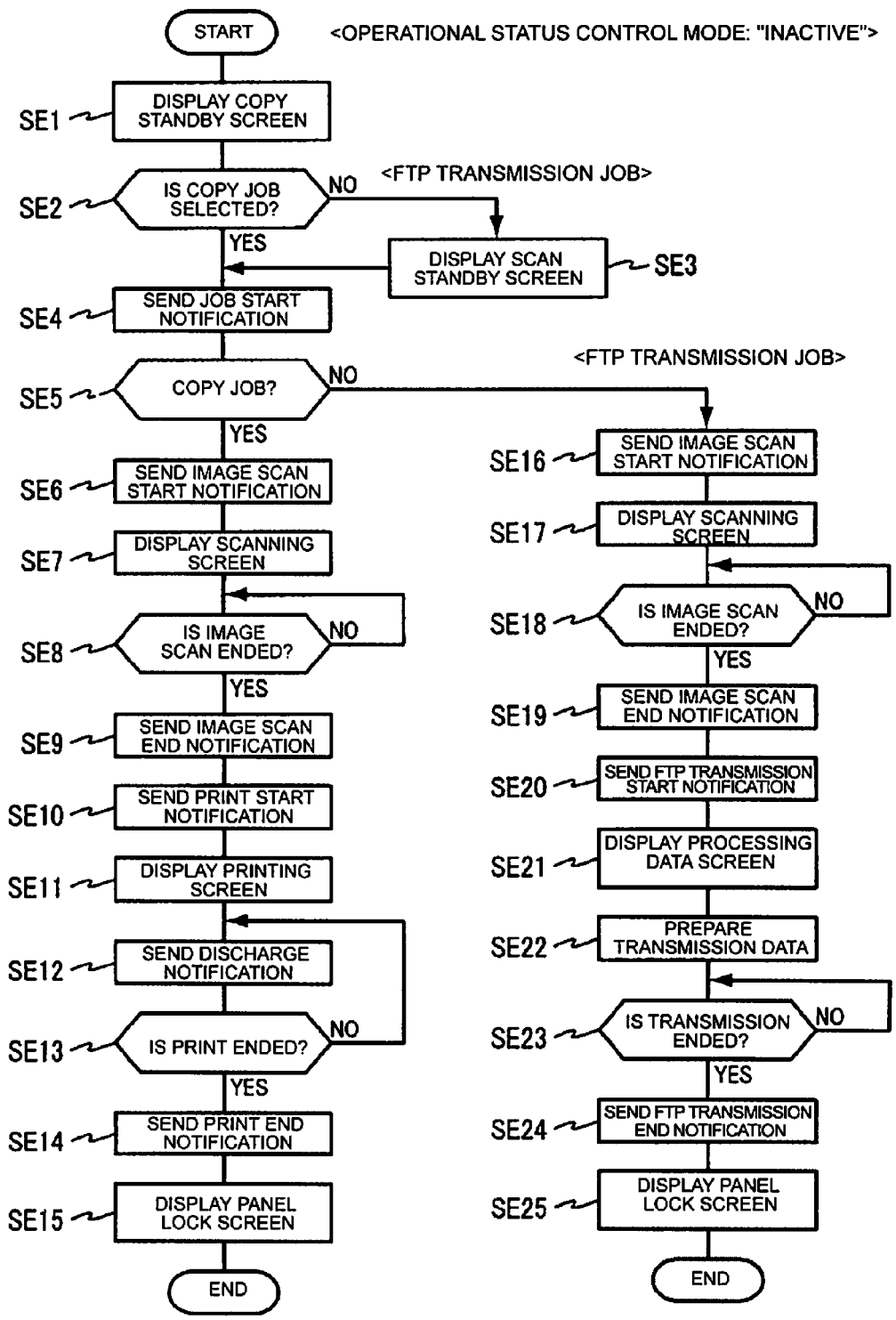
FIG. 10 is a flowchart showing the operation performed by the multifunction peripheral of Embodiment 1 when the operational status control mode is set to "inactive."

First, by using the flowchart shown in FIG. 10 and following the steps denoted by SE, a description is given of the operation performed by multifunction peripheral 1 when the operational status control mode is "inactive."

In an example in the following description, in the middle of an image scan process which is the first-half process of a Copy job or an FTP transmission job, control unit 20 receives an input lock notification (S16 in FIG. 5) transmitted by authentication device 25 in response to an authentication timeout notification.

Further, when the operational status control mode is set to "inactive," operational status manager 35 updates the processing execution status to "not in execution," the input status of display input unit 14 to "not being inputted," and the operational status notification to an idle status notification. These operational statuses and notification are stored in storage unit 26 (SC6 in FIG. 7) and are maintained until the operational status control mode is changed to "active."

Thus, the lock postponement function of authentication device 25 does not work (NO in S13→S16 in FIG. 5), and upon receipt of an authentication timeout notification from authentication server 22, authentication device 25 immediately transmits an input lock notification due to the authentication timeout to multifunction peripheral 1.

Moreover, when the operational status control mode is "inactive," an input lock notification due to an insufficient balance (S11 in FIG. 5) is transmitted in the middle of a print process in the case of the Copy job, and is not transmitted in the case of the FTP transmission job since no upper use limit is set for the FTP transmission.

SE1: When a user of multifunction peripheral 1 of this embodiment holds his or her own card over IC card reader 24, which is connected to authentication device 25, and is authenticated based on the authentication information, the Copy Standby screen is displayed on display part 14a of display input unit 14 (S1→S2→SA1→SA2→YES in S3→S5 in FIG. 5→YES in SB1→SB2 in FIG. 6).

Upon the selection of the Copy job, the user makes various settings regarding the Copy job (such as sheet size, copy intensity, scale, and black-and-white print) on the Copy Standby screen, and then presses input button 14b to instruct the start of the job (called a start button below).

Upon selection of the FTP transmission job, the user presses input button 14b which instructs the start of FTP transmission (called an FTP transmission button below).

SE2: Upon the receipt of a press notification for the FTP transmission button from display input unit 14, control unit 20 of multifunction peripheral 1 sends the press notification to input-unit controller 32, and the operation proceeds to Step SE3. Moreover, upon receipt of a job start notification for Copy (called a Copy start notification below) from display input unit 14 along with the Copy setting information set by the user, control unit 20 sends the Copy setting information and the Copy start notification to input-unit controller 32, and the operation proceeds to Step SE4.

SE3: In control unit 20 of multifunction peripheral 1, upon receipt of the press notification for the FTP transmission button, input-unit controller 32 sends display input unit 14 an Image Scan Standby screen display notification to display a screen for making settings for an image scan process or the like of FTP transmission. Display input unit 14 switches the Copy Standby screen on display part 14a to the Image Scan Standby screen.

Here, since input-unit controller 32 has not received a process start notification from job manager 31, the operation for screen display notification shown in FIG. 6 is not performed.

The user makes various settings regarding FTP transmission (such as the format of a transmission file and the designation of a folder to which the file is to be transmitted) on the Image Scan Standby screen, and presses the start button.

Upon receipt of a job start notification for FTP transmission (called an FTP transmission start notification below) from display input unit 14 along with the FTP transmission setting information set by the user, control unit 20 sends the FTP transmission setting information and the FTP transmission start notification to input-unit controller 32, and the operation proceeds to Step SE4.

Figure 9:
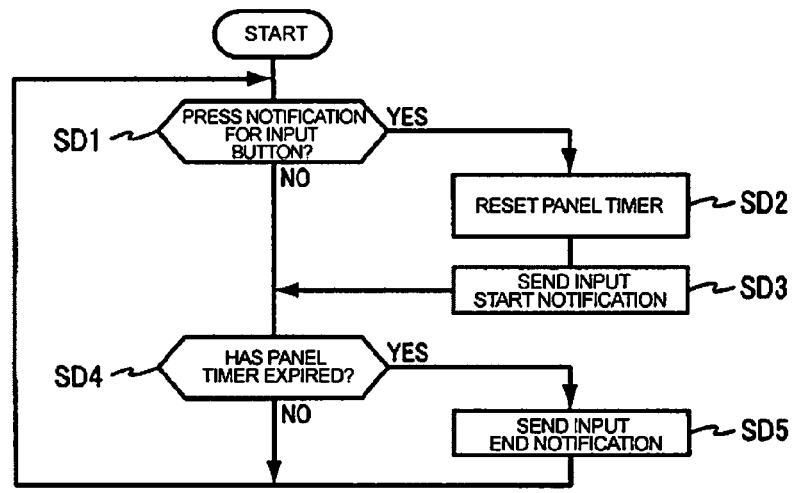
FIG. 9 is a flowchart showing the operation for input status notification performed by the multifunction peripheral of Embodiment 1.

Note that, every time input button 14b is pressed in Steps SE1 and SE2 above, a press notification is sent to input-unit controller 32, and input-unit controller 32 performs the operation for input status notification shown in FIG. 9 (SD3 and SD5 in FIG. 9). Then, upon receipt of an input start notification or an input end notification, operational status manager 35 performs the operation for operational status notification in Steps SC7, SC10, and SC19 to SC22 shown in FIG. 7.

SE4: In control unit 20, upon receipt of the job start notification (the Copy start notification or the FTP transmission start notification) from display input unit 14, input-unit controller 32 sends job manager 31 the job start notification along with the setting information. Then, the operation proceeds to Step SE5.

SE5: In control unit 20, if job manager 31 receives a Copy start notification as the job start notification along with the setting information, the operation proceeds to Step SE6 to start the Copy job. If job manager 31 receives an FTP transmission start notification as the job start notification along with the setting information, the operation proceeds to Step SE16 to start the FTP transmission job.

SE6: In control unit 20, after starting the Copy job, job manager 31 sends operational status manager 35 and input-unit controller 32 an image scan start notification to start an image scan process which is the first-half process of the Copy job, and sends image scan controller 33 the image scan start notification along with the Copy setting information.

Figure 7:
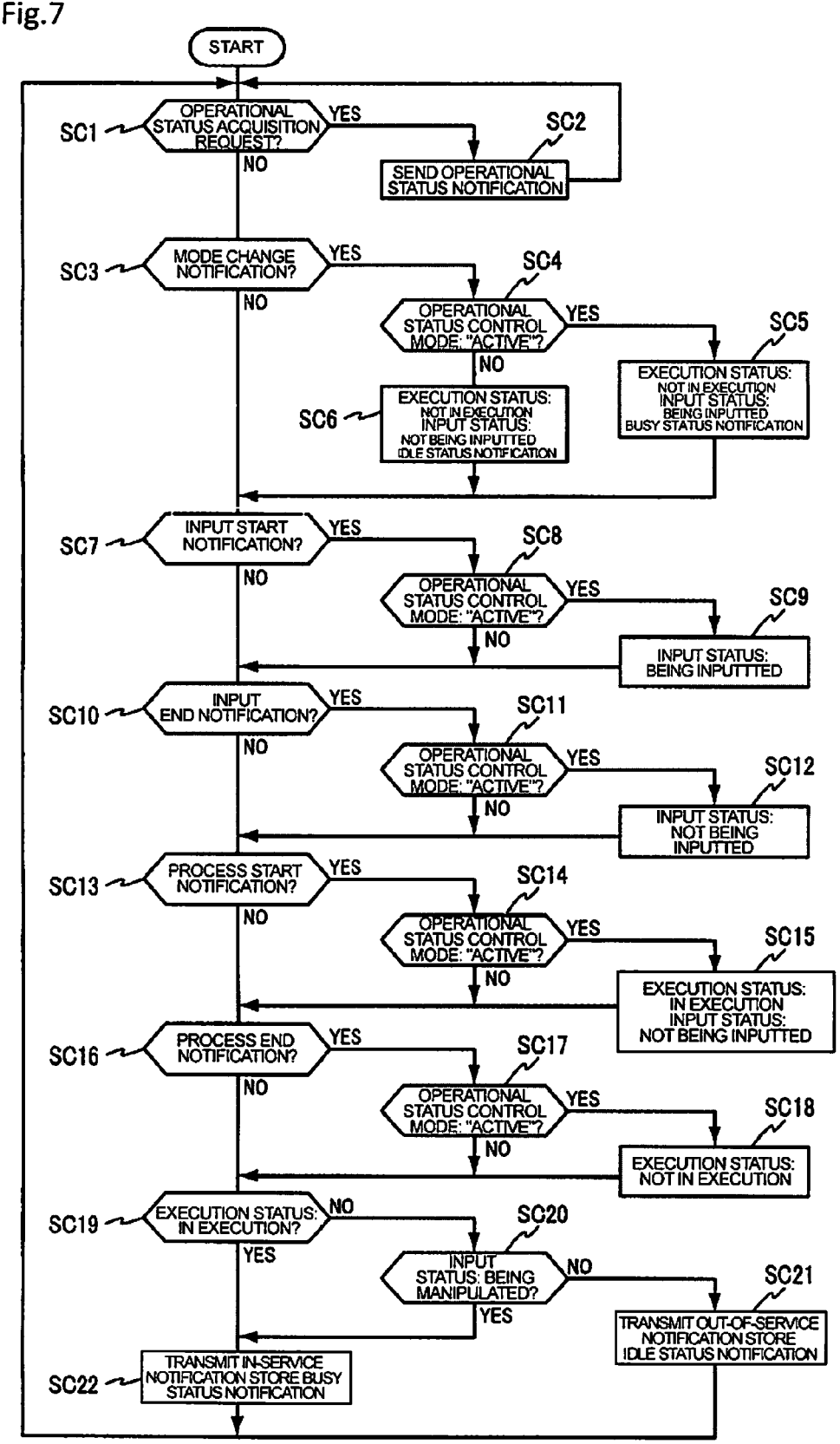
FIG. 7 is a flowchart showing the operation for operational status notification performed by the multifunction peripheral of Embodiment 1.

Here, upon receipt of the image scan start notification, operational status manager 35 does not update the operational statuses since the operational status control mode is "inactive" (NO in SC14 in FIG. 7). Then, operational status manager 35 sends an idle status notification to panel lock controller 34 and transmits an out-of-service notification to authentication device 25 (SC21 in FIG. 7).

SE7: In control unit 20, upon receipt of the image scan start notification, input-unit controller 32 sends display input unit 14 a Scanning screen display notification to display the Scanning screen next. Display input unit 14 then switches the Copy standby screen on display part 14a to the Scanning screen.

Here, input-unit controller 32 sends the Scanning screen display notification to display the Scanning screen next in response to the image scan start notification since an input lock notification has not been received from authentication device 25 and the panel lock screen is not displayed (YES in SB12→NO in SB13→NO in SB14→SB17 in FIG. 6).

SE8: In control unit 20, upon receipt of the image scan start notification along with the Copy setting information, image scan controller 33 scans, with scanner 17, an image on a document set by the user on ADF 15 or on contact glass 16, according to the Copy setting information. Meanwhile, image scan controller 33 stands by waiting for completion of the scan. Upon completion of the scan, the operation proceeds to Step SE9. During the scan, image scan controller 33 continues to stand by.

During the image scan process, the Scanning screen displayed on display part 14a presents the progress of the image scan by showing which document out of the total number of documents is currently being scanned.

Further, in this embodiment, panel lock controller 34 receives an input lock notification from authentication device 25 in the middle of this image scan process. Then, since the operational status control mode is "inactive" and therefore the operational status notification acquired from operational status manager 35 is an idle status notification, panel lock controller 34 sends an input lock notification to input-unit controller 32. Then, since the display level of the Scanning screen (150 (see FIG. 4A)) currently being displayed is higher than that of the panel lock screen (100) to be displayed, input-unit controller 32 continues to display the Scanning screen currently displayed (YES in SB3→NO in SB9→SB7→YES in SB8→YES in SB9→SB10 in FIG. 6).

SE9: In control unit 20, upon recognition of the completion of the document scan, image scan controller 33 sends job manager 31 an image scan end notification along with scanned image data.

SE10: In control unit 20, upon receipt of the image scan end notification, job manager 31 sends operational status manager 35 the image scan end notification. Then, job manager sends operational status manager 35 and input-unit controller 32 a print start notification to start a print process which is the second-half process of the Copy job, and sends image processor 27 the print start notification along with the Copy setting information and the image data.

Here, upon receipt of the image scan end notification, operational status manager 35 does not update the operational statuses since the operational status control mode is "inactive" (NO in SC17 in FIG. 7). Then, operational status manager 35 sends an idle status notification to panel lock controller 34 and transmits an out-of-service notification to authentication device 25 (SC21 in FIG. 7).

Further, upon receipt of the print start notification, operational status manager 35 does not update the operational status since the operational status control mode is "inactive" (NO in SC14 in FIG. 7). Then, operational status manager 35 sends panel lock controller 34 an idle status notification and sends authentication device 25 an out-of-service notification (SC21 in FIG. 7).

SE11: In control unit 20, upon receipt of the print start notification, input-unit controller 32 sends display input unit 14 a Printing screen display notification to display the Printing screen next. Display input unit 14 then switches the Scanning screen on display part 14a to the Printing screen.

Here, since the input lock notification received from authentication device 25 is stored in storage unit 26, input-unit controller 32 tries to display the panel lock screen in response to the print start notification. However, since the operational status control mode is set to "inactive," input-unit controller 32 compares the display level of the panel lock screen (100 (see FIG. 4A)) with that of the Printing screen (140) to be displayed next, and determines that the Printing screen has the higher display level. Thus, input-unit controller 32 sends display input unit 14 the Printing screen display notification (YES in SB12→NO in SB13→YES in SB14→YES in SB15→YES in SB16→SB17 in FIG. 6).

SE12: In control unit 20, upon receipt of the print start notification along with the Copy setting information and the image data, image processor 27 starts a print process, i.e., converts the image data into print data printable by print unit 2 according to the Copy setting information, and sends the print data along with the Copy setting information to print unit 2. Based on the print data, print unit 2 prints an image from the print data on a sheet according to the Copy setting information. Then, every time a printed sheet is discharged, print unit 2 sends image processor a discharge notification. Image processor 27 sends the discharge notification to job manager 31, and job manager 31 transmits the discharge notification to authentication device 25 via FDI 23 (S6 in FIG. 5).

SE13: In control unit 20, print unit 2 stands by waiting for completion of the printing while sending the discharge notifications. Upon completion of the printing, print unit 2 sends image processor 27 a print completion notification, and the operation proceeds to Step SE14. During execution of the printing process, print unit 2 continues to stand by while sending the discharge notifications.

During the printing process, the Printing screen displayed on display part 14a presents the progress of the image scan by showing which copy out of the total number of copies is currently being printed.

Even if panel lock controller 34 receives a first input lock notification (S11 in FIG. 11) from authentication device 25 due to an insufficient balance in the middle of this print process and sends the input lock notification to input-unit controller 32, input-unit controller 32 continues to display the Printing screen since the operational status control mode is set to "inactive" and the display level of the Printing screen (140) currently displayed is higher than that of the panel lock display (100) to be displayed (YES in SB3→NO in SB4→SB7→YES in SB8→YES in SB9→SB10 in FIG. 6).

SE14: In control unit 20, upon receipt of the print completion notification, image processor 27 sends job manager 31 a print end notification. Job manager 31 sends the print end notification to operational status manager 35, and sends a job end notification for Copy to input-unit controller 32.

Here, upon receipt of the print end notification, operational status manager 35 does not update the operational statuses since the operational status control mode is "inactive" (NO in SC17 in FIG. 7). Then, operational status manager 35 sends an idle status notification to panel lock controller 34 and transmits an out-of-service notification to authentication device 25 (SC21 in FIG. 7).

SE15: In control unit 20, upon receipt of the job end notification for Copy, input-unit controller 32 tries to display a standby screen for the executed job, i.e., the Copy Standby screen. However, since the input lock notification received from authentication device 25 is stored in storage unit 26, input-unit controller 32 sends display input unit 14 a panel lock screen display notification to display the panel lock screen. Display input unit 19 then switches the Printing screen on display part 14a to the panel lock screen. Then, the operation returns to Step SE1 where control unit 20 stands by with the panel lock screen being displayed on display part 14a.

To be more specific, upon receipt of the job end notification for Copy, input-unit controller 32 tries to display a standby screen for the executed job, i.e., the Copy standby screen. However, since the input lock notification received from authentication device 25 is stored in storage unit 26 and the operational status control mode is set to "inactive," input-unit controller 32 compares the display level of the panel lock screen (100) with the display level of the Copy Standby screen (50) to be displayed next, and input unit controller 32 sends display input unit 14 a panel lock screen display notification to display the panel lock screen which has the higher display level (YES in SB12→NO in SB13→YES in SB14→YES in SB15→NO in SB16→SB18 in FIG. 6).

Multifunction peripheral 1 of this embodiment performs the Copy job in this way when the operational status control mode is set to "inactive." Next, a description is given of how multifunction peripheral 1 of this embodiment performs the FTP transmission job when the operational status control mode is set to "inactive."

SE16: In control unit 20, after starting the FTP transmission job, job manager 31 sends operational status manager 35 and input-unit controller 32 an image scan start notification to start an image scan process which is the first-half process of the FTP transmission job, and sends image scan controller 33 the image scan start notification along with the FTP transmission setting information.

Here, upon receipt of the image scan start notification, operational status manager 35 does not update the operational status since the operational status control mode is "inactive" (NO in SC14 in FIG. 7). Then, operational status manager 35 sends an idle status notification to panel lock controller 34 and transmits an out-of-service notification to authentication device 25 (SC21 in FIG. 7).

SE17: In control unit 20, upon receipt of the image scan start notification, input-unit controller 32 sends display input unit 14 a Scanning screen display notification to display the Scanning screen next. Display input unit 14 switches the Image Scan Standby screen on display part 14a to the Scanning screen.

Here, input-unit controller 32 sends the Scanning screen display notification to display the Scanning screen next in response to the image scan start notification since an input lock notification has not been received and the panel lock screen is not displayed (YES in SB12→NO in SB13→NO in SB14→SB17 in FIG. 6).

SE18: In control unit 20, upon receipt of the image scan start notification along with the FTP transmission setting information, image scan controller 33 scans, with scanner 17, a document set by the user on ADF 15 or on contact glass 16 according to the FTP transmission setting information, and in the meantime, stands by waiting for completion of the scan. Upon completion of the scan, the operation proceeds to Step SE19. During the scan, image scan controller 33 continues to stand by.

During the image scan process, the Scanning screen displayed on display part 14a presents the progress of the image scan by showing which document out of the total number of documents is currently being scanned.

Further, in this embodiment, panel lock controller 34 receives an input lock notification from authentication device 25 in the middle of this image scan process. Then, since the operational status control mode is "inactive" and therefore the operational status notification acquired from operational status manager 35 is an idle status notification, panel lock controller 34 sends an input lock notification to input-unit controller 32. Then, since the display level of the Scanning screen (150 (see FIG. 4A)) currently being displayed is higher than that of the panel lock screen (100) to be displayed, input-unit controller 32 continues to display the Scanning screen currently displayed (YES in SB3→NO in SB4→SB7→YES in SB8→YES in SB9→SB10 in FIG. 6).

SE19: In control unit 20, upon recognition of completion of the document scan, image scan controller 33 sends job manager 31 an image scan end notification along with scanned image data.

SE20: In control unit 20, upon receipt of the image scan end notification, job manager 31 sends operational status manager 35 the image scan end notification. Then, job manager sends operational status manager 35 and input-unit controller 32 a transmission start notification to start an FTP transmission process which is the second-half process of the FTP transmission job, and sends image processor 27 the transmission start notification along with the FTP transmission setting information and the image data.

Here, upon receipt of the image scan end notification, operational status manager 35 does not update the operational status since the operational status control mode is "inactive" (NO in SC17 in FIG. 7). Then, operational status manager 35 sends an idle status notification to panel lock controller 34 and transmits an out-of-service notification to authentication device 25 (SC21 in FIG. 7).

Further, upon receipt of the FTP transmission start notification, operational status manager 35 does not update the operational status since the operational status control mode is "inactive" (NO in SC14 in FIG. 7). Then, operational status manager 35 sends an idle status notification to panel lock controller 34 and transmits an out-of-service notification to authentication device 25 (SC21 in FIG. 7).

SE21: In control unit 20, upon receipt of the FTP transmission start notification, input-unit controller 32 sends display input unit 14 a Processing Data screen display notification to display the Processing Data screen next. Display input unit 14 switches the Scanning screen on display part 14a to the Processing Data screen.

Here, since the input lock notification received from authentication device 25 is stored in storage unit 26, input-unit controller 32 tires to display the panel lock screen in response to the transmission start notification. However, since the operational status control mode is set to "inactive," input-unit controller 32 compares the display level of the panel lock screen (100 (see FIG. 4A)) with that of the Processing Data screen (130) to be displayed next, and determines that the Processing Data screen has the higher display level. Thus, input-unit controller 32 sends display input unit 14 a Processing Data screen display notification (YES in SB12→NO in SB13→YES in SB14→YES in SB15→YES in SB16→SB17 in FIG. 6).

SE22: upon receipt of the FTP transmission start notification along with the FTP transmission setting information and the image data, image processor 27 converts the image data into a file in a format designated in the FTP transmission setting information, and sends the file along with the FTP transmission setting information to output unit 28. Output unit 28 then transmits the file to a destination folder designated in the FTP transmission setting information.

SE23: In control unit 20, output unit 28 stands by waiting for completion of the FTP transmission, and upon completion of the FTP transmission, sends an FTP transmission completion notification to image processor 27. The operation then proceeds to Step SE24. During execution of the FTP transmission process, output unit 28 continues to stand by.

During the FTP transmission process, the Processing Data screen displayed on display part 14a presents the current progress of the FTP transmission with a text such as "Preparing Transmission Data."

Even if panel lock controller 34 receives, in the middle of this FTP transmission process, a first input lock notification from authentication device 25, which transmits an input lock notification irrespective of the operational state of multifunction peripheral 1, and sends the input lock notification to input-unit controller 32, input-unit controller 32 continues to display the Processing Data screen since the operational status control mode is set to "inactive" and the display level of the Processing Data screen (130) currently displayed is higher than that of the panel lock display (100) to be displayed (YES in SB3→NO in SB4→SB7→YES in SB8→YES in SB9→SB10 in FIG. 6).

SE24: In control unit 20, upon receipt of the FTP transmission completion notification, image processor 27 sends job manager 31 an FTP transmission end notification. Job manager 31 sends the FTP transmission end notification to operational status manager 35, and sends a job end notification for FTP transmission to input-unit controller 32.

Here, upon receipt of the FTP transmission end notification, operational status manager 35 does not update the operational status since the operational status control mode is "inactive" (NO in SC17 in FIG. 7). Then, operational status manager 35 sends an idle status notification to panel lock controller 34 and transmits an out-of-service notification to authentication device 25 (SC21 in FIG. 7).

SE25: In control unit 20, upon receipt of the job end notification for FTP transmission, input-unit controller 32 tries to display a standby screen for the executed job, i.e., the Image Scan Standby screen for the FTP transmission job. However, since the input lock notification received from authentication device 25 is stored in storage unit 26, input-unit controller 32 sends display input unit 14 a panel lock screen display notification to display the panel lock screen. Display input unit 14 then switches the Processing Data screen on display part 14a to the panel lock screen. Then, the operation returns to Step SE1 where control unit 20 stands by with the panel lock screen being displayed on display part 14a.

To be more specific, upon receipt of the job end notification, input-unit controller 32 tries to display a standby screen for the executed job, i.e., the Image Scan Standby screen for the FTP transmission job. However, since the input lock notification received from authentication device 25 is stored in storage unit 26 and the operational status control mode is set to "inactive," input-unit controller 32 compares the display level of the panel lock screen (100) with the display level of the Image Scan Standby screen (50) to be displayed next, and sends display input unit 14 a panel lock screen display notification to display the panel lock screen which has the higher display level (YES in SB12→NO in SB13→YES in SB14→YES in SB15→NO in SB16→SB18 in FIG. 6).

Multifunction peripheral 1 of this embodiment performs the FTP transmission job in this way when the operational status control mode is set to "inactive."

By using the flowchart shown in FIG. 11 and following the steps denoted by SF, a description is given below of the operation performed by multifunction peripheral 1 in this embodiment when the operational status control mode is set to "active."

In this embodiment, when the operational status control mode is "active," the lock postponement function of authentication device 25 works. As an example in the following description, as soon as multifunction peripheral 1 ends an image scan process which is the first-half process of both the Copy job and the FTP transmission job, multifunction peripheral 1 receives an input lock notification due to authentication timeout transmitted from authentication device 25 upon cancellation of lock postponement (YES in S13→S14→YES in S15→S16 in FIG. 5).

Further, when the operational status control mode is set to "active," operational status manager 35 updates the process execution status to "not in execution," the input status of display input unit 14 to "being inputted," and the operational status notification to a busy status notification. These operational statuses and notification are stored in storage unit 26 (SC6 in FIG. 7).

An input lock notification due to an insufficient balance (S11 in FIG. 5) is transmitted in the same manner as in the case where the operational status control mode is "inactive."

The operation in Steps SF1 to SF5 in this description is the same as in the aforementioned case where the operational status control mode is "inactive," and is therefore not described again here.

Assume a case where panel lock controller 34 receives an input lock notification from authentication device 25 having no lock postponement function while a user is making various settings for Copy on the Copy Standby screen in Step SF1. In this case, since the operational status control mode is set to "active" and input buttons 14b are manipulated to make the settings, the operational status notification acquired from operational status manager 35 is a busy status notification (SC22 in FIG. 7). Thus, panel lock controller 34 sends an input lock notification after cancelling the lock postponement, i.e., upon receipt of an input end notification due to panel timeout (SC21 in FIG. 7). Hence, the Copy Standby screen currently displayed continues to be displayed, and the panel lock screen is displayed after the settings are made (YES in SB3→YES in SB4→SB5→YES in SB6→SB7→NO in SB8→SB11 in FIG. 6). The same applies to SF3.

Authentication device 25 of this embodiment has the lock postponement function. Thus, when input button 14b is first manipulated, operational status manager 35 updates the input status to "being inputted" (SC9 in FIG. 7), and as a result of the operational status determination, transmits an in-service notification to authentication device 25 (SC22 in FIG. 7). Hence, the lock postponement is performed on the authentication device 25 side. Then, upon receipt of an input end notification due to a panel timeout, operational status manager 35 updates the input status to "not being inputted" (SC12 in FIG. 7), and transmits an out-of-service notification to authentication device 25 (SC21 in FIG. 7). Thereby, authentication device 25 cancels the lock postponement and transmits an input lock notification to panel lock controller 34 (YES in S13→S14→YES in S15→S16 in FIG. 5). In this way, the Copy Standby screen currently displayed continues to be displayed, and the panel lock screen is displayed after the settings are made (YES in SB3→NO in SB4→SB7→NO in SB8→SB11 in FIG. 6).

In this way, in this embodiment, when the operational status control mode is set to "active," irrespective of whether authentication device 25 has the postponement function or not, the panel lock screen is not displayed. This makes multifunction peripheral 1 unavailable while the user is making detailed settings for a job.

SF6: In control unit 20, after starting the Copy job, job manager 31 sends operational status manager 35 and input-unit controller 32 an image scan start notification to start an image scan process which is the first-half process of the Copy job, and sends image scan controller 33 the image scan start notification along with the Copy setting information.

Here, upon receipt of the image scan start notification, operational status manager 35 updates the operational statuses and notification, i.e., updates the execution status to "in execution," the input status to "not being inputted," and the operational status notification to a busy status notification (SC15 in FIG. 7), and operational status manager 35 transmits an in-service notification to authentication device 25 (SC22 in FIG. 7).

SF7: In control unit 20, upon receipt of the image scan start notification, input-unit controller 32 sends display input unit 14 a Scanning screen display notification to display the Scanning screen next. Display input unit 14 then switches the Copy Standby screen on display part 14a to the Scanning screen.

Here, in response to the image scan start notification, input-unit controller 32 sends the Scanning screen display notification to display the Scanning screen next because an input lock notification has not been received and the panel lock screen is not displayed (YES in SB12→NO in SB13→NO in SB14→SB17 in FIG. 6).

SF8: In control unit 20, upon receipt of the image scan start notification along with the Copy setting information, image scan controller 33 scans, with scanner 17, an image on a document set by the user on ADF 15 or on contact glass 16, according to the Copy setting information. Meanwhile, image scan controller 33 stands by waiting for completion of the scan. Upon completion of the scan, the operation proceeds to Step SF9. During the scan, image scan controller 33 continues to stand by.

During the image scan process, the Scanning screen displayed on display part 14a presents the progress of the image scan by showing which document out of the total number of documents is currently being scanned.

Even if panel lock controller 34 receives, in the middle of this image scan process, an input lock notification from authentication device 25 which transmits an input lock notification irrespective of the operational state of multifunction peripheral 1, panel lock controller 34 sends the input lock notification to input-unit controller 32 after cancelling the lock postponement, i.e., after the image scan process is ended, since the operational status control mode is set to "active" and the operational status notification acquired from operational status manager 35 is a busy status notification. Thus, the Scanning screen currently displayed continues to be displayed, and the panel lock screen is displayed after the image scan is ended (YES in SB3→YES in SB4→SB5→YES in SB6→SB7→NO in SB8→SB11 in FIG. 6).

SF9: In control unit 20, upon recognition that the document scan is completed, image scan controller 33 sends job manager 31 an image scan end notification along with scanned image data. Upon receipt of the image scan end notification, job manager 31 sends operational status manager 35 the image scan end notification.

SF10: In control unit 20, upon receipt of the image scan end notification, operational status manager 35 transmits an out-of-service notification to authentication device 25.

To be more specific, since the operational status control mode is set to "active," upon receipt of the image scan end notification, operational status manager 35 updates the operational status, i.e., the execution status to "not in execution" and the operational status notification to an idle status notification (SC18 in FIG. 7). Operational status manager 35 then sends the idle status notification to panel lock controller 34 and transmits an out-of-service notification to authentication device 25 (SC21 in FIG. 7).

In response to the out-of-service notification, authentication device 25 cancels the lock postponement, and transmits an input lock notification to panel lock controller 34. Upon receipt of the input lock notification, panel lock controller 34 sends the input lock notification to input-unit controller 32 since the operational status notification acquired is the idle status notification. Upon receipt of the input lock notification from panel lock controller 34, input-unit controller 32 sends display input unit 14 a panel lock screen display notification. Display input unit 14 then switches the Scanning screen on display part 14a to the panel lock screen (YES in SB3→NO in SB4→SB7→NO in SB8→SB11 in FIG. 6).

SF11: In control unit 20, after sending the image scan end notification to operational status manager 35, job manager sends operational status manager 35 and input-unit controller 32 a print start notification to start a print process which is the second-half process of the Copy job, and sends image processor 27 the print start notification along with the Copy setting information and the image data.

Here, since the operational status control mode is set to "active," upon receipt of the print start notification, operational status manager 35 updates the operational statuses and notification, i.e., updates the execution status to "in execution," the input status to "not being inputted," and the operational status notification to a busy status notification (S15 in FIG. 7). Then, operational status manager 35 transmits an in-service notification to authentication device 25 (SC22 in FIG. 7).

Input-unit controller 32 tries to display the Printing screen upon receipt of the print start notification. However, since the panel lock screen is already displayed and the operational status control mode is set to "active," input-unit controller 32 does not send display input unit 14 a panel lock screen display notification, but continues to display the panel lock screen on display part 14a (YES in SB12→YES in SB13→NO in SB15→SB18 in FIG. 6).

SF12: In control unit 20, upon receipt of the print start notification along with the Copy setting information and the image data, image processor 27 starts a print process, and as in Step SE12 in the above case where the operational status control mode is "inactive," print unit 2 prints an image from the print data on a sheet, and job manager 31 transmits, to authentication device 25 (S6 in FIG. 5), a discharge notification which is sent every time a printed sheet is discharged.

SF13: In control unit 20, print unit 2 stands by waiting for completion of the printing while sending the discharge notifications, and upon completion of the printing, sends image processor 27 a print completion notification. The operation then proceeds to Step SF14. During execution of the printing process, print unit 2 continues to stand by while sending the discharge notification. In this event, the panel lock screen is displayed on display part 14a.

Assume a case where panel lock controller 34 receives a first input lock notification (S11 in FIG. 5) due to an insufficient balance from authentication device 25 in the middle of this print process. In this case, since the operational status control mode is set to "active" and therefore the operational status notification acquired from operational status manager 35 is a busy status notification, panel lock controller 34 sends an input lock notification after cancellation of lock postponement, i.e., after the print process is ended. Hence, the Printing screen currently displayed continues to be displayed, and the panel lock screen is displayed after the print process is ended (YES in SB3→YES in SB4→SB5→YES in SB6→SB7→NO in SB8→SB11 in FIG. 6).

SF14: In control unit 20, upon receipt of the print completion notification, image processor 27 sends job manager 31 a print end notification, and job manager 31 sends the print end notification to operational status manager 35, and sends a job end notification for Copy to input-unit controller 32.

In this event, upon receipt of the print end notification, operational status manager 35 updates the operational status, i.e., the execution status to "not in execution" and the operational status notification to an idle status notification since the operational status control mode is set to "active" (SC18 in FIG. 7). Then, operational status manager 35 sends the idle status notification to panel lock controller 34, and transmits an out-of-service notification to authentication device 25 (SC21 in FIG. 7).

SF15: In control unit 20, upon receipt of the job end notification for Copy, input-unit controller 32 tries to display a standby screen for the Copy job executed, i.e., the Copy standby screen. However, since the panel lock screen is already displayed and the operational status control mode is set to "active," input-unit controller 32 does not send a panel lock screen display notification to display input unit 14, but continues to display the panel lock screen on display part 14a (YES in SB12→YES in SB13→NO in SB15→SB18 in FIG. 6). The operation then returns to Step SF1 where control unit 20 stands by with the panel lock screen being displayed.

Multifunction peripheral 1 of this embodiment performs the Copy job in this way when the operational status control mode is set to "active." Next, a description is given of the operation for the FTP transmission job performed when the operational status control mode is set to "active."

SF16: In control unit 20, after starting the FTP transmission job, job manager 31 sends operational status manager 35 and input-unit controller 32 an image scan start notification to start an image scan process which is the first-half process of the FTP transmission job, and also sends image scan controller 33 the image scan start notification along with the FTP transmission setting information.

Here, upon receipt of the image scan start notification, operational status manager 35 updates the operational statuses and notification, i.e., updates the execution status to "in execution," the input status to "not being inputted," and the operational status notification to a busy status notification (SC15 in FIG. 7), and transmits an in-service notification to authentication device 25 (SC22 in FIG. 7).

SF17: In control unit 20, upon receipt of the image scan start notification, input-unit controller 32 sends display input unit 14 a Scanning screen display notification to display the Scanning screen next. Display input unit 14 then switches the Image Scan Standby screen on display part 14a to the Scanning screen.

Here, in response to the image scan start notification, input-unit controller 32 sends the Scanning screen display notification to display the Scanning screen next because an input lock notification has not been received and the panel lock screen is not displayed (YES in SB12→NO in SB13→NO in SB14→SB17 in FIG. 6).

SF18: In control unit 20, upon receipt of the image scan start notification along with the FTP transmission setting information, image scan controller 33 scans, with scanner 17, an image on a document set by the user on ADF 15 or on contact glass 16, according to the FTP transmission setting information. Meanwhile, image scan controller 33 stands by waiting for completion of the scan. Upon completion of the scan, the operation proceeds to Step SF19. During the scan, image scan controller 33 continues to stand by.

During the image scan process, the Scanning screen displayed on display part 14a presents the progress of the image scan by showing which document out of the total number of documents is currently being scanned.

Even if panel lock controller 34 receives, in the middle of this image scan process, an input lock notification from authentication device 25 which transmits an input lock notification irrespective of the operational state of multifunction peripheral 1, panel lock controller 34 transmits the input lock notification after cancelling the lock postponement, i.e., after the image scan process is ended, since the operational status control mode is set to "active" and the operational status notification acquired from operational status manager 35 is a busy status notification. Thus, the Scanning screen currently displayed continues to be displayed, and the panel lock screen is displayed after the image scan is ended (YES in SB3→YES in SB4→SB5→YES in SB6→SB7→NO in SB8→SB11 in FIG. 6).

SF19: In control unit 20, upon a recognition that the document scan is completed, image scan controller 33 sends job manager 31 an image scan end notification along with scanned image data. Upon receipt of the image scan end notification, job manager 31 sends operational status manager 35 the image scan end notification.

SF20: In control unit 20, upon receipt of the image scan end notification, operational status manager 35 transmits an out-of-service notification to authentication device 25.

To be more specific, since the operational status control mode is set to "active," upon receipt of the image scan end notification, operational status manager 35 updates the operational status, i.e., the execution status to "not in execution" and the operational status notification to an idle status notification (SC18 in FIG. 7). Operational status manager 35 then sends the idle status notification to panel lock controller 34 and transmits an out-of-service notification to authentication device 25 (SC21 in FIG. 7).

In response to the out-of-service notification, authentication device 25 cancels the lock postponement, and transmits an input lock notification to panel lock controller 34. Upon receipt of the input lock notification, panel lock controller 34 sends the input lock notification to input-unit controller 32 since the operational status notification acquired is the idle status notification. Upon receipt of the input lock notification from panel lock controller 34, input-unit controller 32 sends display input unit 14 a panel lock screen display notification. Display input unit 14 then switches the Scanning screen on display part 14*a* to the panel lock screen (YES in SB3→NO in SB4→SB7→NO in SB8→SB11 in FIG. 6).

SF21: In control unit 20, after sending the image scan end notification to operational status manager 35, job manager 31 sends operational status manager 35 and input-unit controller 32 an FTP transmission start notification to start an FTP transmission process which is the second-half process of the FTP transmission job, and also sends image processor 27 the FTP transmission start notification along with the FTP transmission setting information and the image data.

Here, since the operational status control mode is set to "active," upon receipt of the FTP transmission start notification, operational status manager 35 updates the operational statuses and notification, i.e., updates the execution status to "in execution," the input status to "not being inputted," and the operational status notification to a busy status notification (S15 in FIG. 7). Then, operational status manager 35 transmits an in-service notification to authentication device 25 (SC22 in FIG. 7).

Input-unit controller 32 tries to display the Processing Data screen upon receipt of the FTP transmission start notification. However, since the panel lock screen is already displayed and the operational status control mode is set to "active," input-unit controller 32 does not send display input unit 14 a panel lock screen display notification, but continues to display the panel lock screen on display part 14*a* (YES in SB12→YES in SB13→NO in SB15→SB18 in FIG. 6).

SF22: In control unit 20, upon receipt of the FTP transmission start notification along with the FTP transmission setting information and the image data, image processor 27 converts the image data into a file in a format designated in the FTP transmission setting information, and sends the file along with the FTP transmission setting information to output unit 28. Output unit 28 then transmits the file to a destination folder designated in the FTP transmission setting information.

SF23: In control unit 20, output unit 28 stands by waiting for completion of the FTP transmission. Upon completion of the FTP transmission, output unit 28 sends an FTP transmission completion notification to image processor 27. The operation then proceeds to Step SE24. During execution of the FTP transmission process, output unit 28 continues to stand by. The panel lock screen is displayed on display part 14*a* in the meantime.

Assume a case where panel lock controller 34 receives, in the middle of this FTP transmission process, a first input lock notification from authentication device 25 which transmits an input lock notification irrespective of the operational state of multifunction peripheral 1. In this case, since the operational status control mode is set to "active" and therefore the operational status notification acquired from operational status manager 35 is a busy status notification, panel lock controller 34 sends an input lock notification to input-unit controller 32 after cancellation of the lock postponement, i.e., after the FTP transmission process is ended. Hence, input-unit controller 32 continues to display the Processing Data screen currently displayed and displays the panel lock screen after the FTP transmission process is ended (YES in SB3→YES in SB4→SB5→YES in SB6→SB7→NO in SB8→SB11 in FIG. 6).

SF24: In control unit 20, upon receipt of the FTP transmission completion notification, image processor 27 sends job manager 31 a transmission end notification, and job manager 31 sends operational status manager 35 the transmission end notification and sends input-unit controller 32 a job end notification for FTP transmission.

In this event, upon receipt of the transmission end notification, operational status manager 35 updates the operational status, i.e., the execution status to "not in execution" and the operational status notification to an idle status notification since the operational status control mode is set to "active" (SC18 in FIG. 7). Then, operational status manager 35 sends an idle status notification to panel lock controller 34, and transmits an out-of-service notification to authentication device 25 (SC21 in FIG. 7).

SF25: In control unit 20, upon receipt of the job end notification for FTP transmission, input-unit controller 32 tires to display a standby screen for the FTP transmission job executed, i.e., the Image Scan Standby screen. However, since the panel lock screen is already displayed and the operational status control mode is set to "active," input-unit controller 32 does not send a panel lock screen display notification to display input unit 14, but continues to display the panel lock screen on display part 14*a* (YES in SB12→YES in SB13→NO in SB15→SB18 in FIG. 6). The operation then returns to Step SF1 where control unit 20 stands by with the panel lock screen being displayed.

Multifunction peripheral 1 of this embodiment performs the FTP transmission job in this way when the operational status control mode is set to "active."

As described thus far, in this embodiment, when the operational status control mode is set to "inactive," even if multifunction peripheral 1 receives an input lock notification to display the panel lock screen from authentication device 25 which may be configured to transmit an input lock notification irrespective of the operational state of multifunction peripheral 1, or configured to postpone transmission of the input lock notification depending on the operational state of multifunction peripheral 1, the progress of a process can continue to be presented to a user until a job executed by the user is ended and the panel lock screen is displayed. This can be achieved by setting the display levels of the during-process screens to be higher than the display level of the panel lock screen and the display levels of the standby screens to be lower than the display level of the panel lock screen. Since the screen is prevented from being switched to the panel lock screen immediately in response to an input lock notification, the user can always check the progress on the during-process screen (e.g., the Scanning screen) displayed during execution of a job. Thus, user convenience can be improved.

Further, when the operational status control mode is set to "active," even if multifunction peripheral 1 receives an input lock notification from authentication device 25 while the during-process screen is displayed, display of the panel lock screen can be postponed by the lock postponement function until the process is ended. Thus, a user can check the progress of the process on the Scanning screen or the like until the process is ended. User convenience can therefore be improved.

Moreover, when the operational status control mode is "active," authentication device 25 is notified that multifunction peripheral 1 is in service when display input unit 14 is being manipulated. Hence, even if authentication device 25 transmits an input lock notification while a user is making detailed settings for a job such as Copy or FTP transmission, display of the panel lock screen can be postponed by the lock postponement function until the settings are finished being made. Thereby, a switch to the panel lock screen is not made while a user is making detailed settings for a job, and consequently, the user is prevented from becoming unable to use multifunction peripheral 1 while making the settings. User convenience can therefore be improved.

In this embodiment, a process start notification (e.g., an image scan start notification for FTP transmission) is treated as a notification to start display of a screen, and a process end notification (e.g., an image scan end notification for FTP transmission) is treated as a notification to end the display of the screen. Then, if multifunction peripheral 1 receives an input lock notification during execution of a process (e.g., an image scan process for FTP transmission) with the operational status control mode being "active," the panel lock screen is displayed after the process is ended. Alternatively, a job start notification (a job start notification for FTP transmission) may be treated as the notification to start the display of a screen, and a job end notification (e.g., a job end notification for FTP transmission) may be treated as the notification to end the display of the screen. Thereby, the operational status notification can be maintained to be a busy status notification throughout execution of the job. When the job end notification is sent, the operational status notification is updated to an idle status notification. Thus, cancellation of the lock postponement is postponed until the job end notification is sent, and the panel lock screen is displayed after the job is ended. Thus, the progress of all processes performed during execution of a job can continue to be presented to the user.

Embodiment 2

Using FIGS. 12 to 16, a description is given below of a multifunction peripheral of this embodiment. The same portions as those of Embodiment 1 described above are denoted by the same reference numerals and are not described again here.

Figure 12:
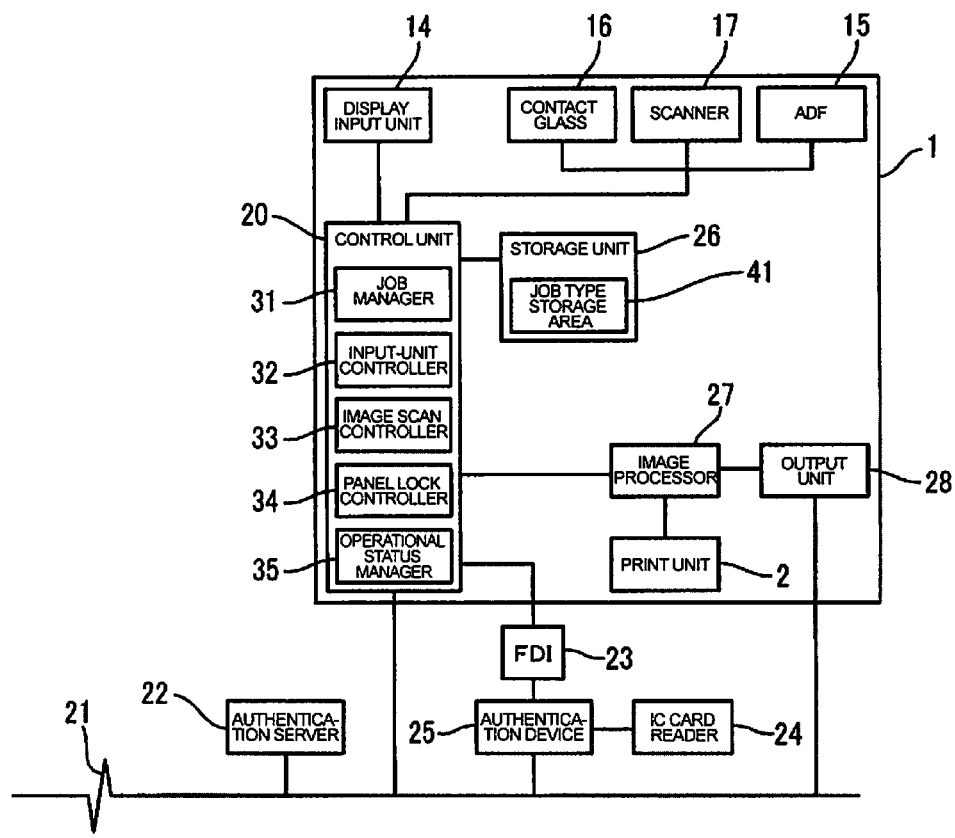
FIG. 12 is a block diagram showing a multifunction peripheral of Embodiment 2.
Figure 13:
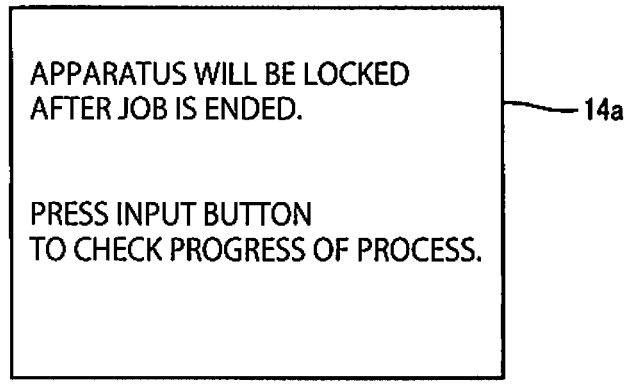
FIG. 13 is an explanatory diagram showing an example of a panel lock warning screen of Embodiment 2.

In this embodiment, a progress presentation job type is preset. The progress presentation job type is the type of a job for which the progress of each process is presented, if selected by a user, during execution of the job until the job is ended. In storage unit 26 of this embodiment, job type storage area 41 is secured in advance, as shown in FIG. 12. When a job coinciding with the progress presentation job type is to be executed with the operational status control mode being "active," the job type is stored in job type storage area 41.

In this embodiment, the Copy job is set as the progress presentation job type in advance, and the job name "Copy" is stored in storage unit 26 in an area outside job type storage area 41.

Further, to store the progress presentation job type in job type storage area 41, the job name of the Copy job "Copy" is stored in job type storage area 41, and is deleted from job type storage area 41 when the job is ended.

Panel lock controller 34 of this embodiment has, in addition to the functions of panel lock controller 34 of Embodiment 1 above, a function of sending a lock postponement notification to input-unit controller 32 when performing lock postponement.

In addition to the functions of input-unit controller 32 of Embodiment 1 above, input-unit controller 32 of this embodiment has the following functions. Specifically, upon receipt of a job start notification along with setting information from display input unit 14 with the operational status control mode being "active," if the job type of the job to be started coincides with the progress presentation job type ("Copy" in this embodiment), input-unit controller 32 stores the name of the job ("Copy" in this embodiment) in job type storage area 41. In addition, upon receipt of a lock postponement notification from panel lock controller 34, input-unit controller 32 reads the job type stored in job type storage area 41 in storage unit 26, and if the job type in job type storage area 41 is "Copy," switches the screen on display part 14a of display input unit 14 to a panel lock warning screen, shown in FIG. 13, with a text indicating that multifunction peripheral 1 is locked after the job in execution is ended. In addition, upon receipt of a press notification for input button 14b from display input unit 14 with the panel lock warning screen being displayed, input-unit controller 32 transmits, to display input unit 14, a panel lock warning screen hide notification to hide the panel lock warning screen so that the panel lock warning screen may be switched to a during-process screen.

Operational status manager 35 of this embodiment is different from operational status manager 35 of Embodiment 1 above in the following point. Specifically, when the operational status control mode is "active," upon receipt of an image scan end notification from job manager 31 as a process end notification, operational status manager 35 does not update the process execution status if the job coincides with the job type ("Copy") stored in job type storage area 91. Meanwhile, upon receipt of a print end notification from job manager 31 as a process end notification indicating the end of the job, operational status manager 35 updates the process execution status to "not in execution."

The operation of multifunction peripheral 1 having the configuration described above, and with authentication server 22, and authentication device 25, is described below.

The operation of authentication device 25 and authentication server 22 of this embodiment is the same as that of authentication device 25 and authentication server 22 of Embodiment 1 shown in FIG. 5, and is therefore not described again here.

By using the flowchart shown in FIG. 14 and following the steps denoted by SG, a description is given below of the operation for screen display notification performed by control unit 20 of multifunction peripheral 1 of this embodiment.

The operation performed in Steps SG1 to SG5 of this embodiment is the same as the operation performed in Steps SB1 to SB5 of the operation for screen display notification of Embodiment 1 shown in FIG. 6, and is therefore not described again here.

SG6: In control unit 20, after starting the lock postponement, panel lock controller 34 sends input-unit controller 32 a lock postponement notification indicating that lock postponement is being performed. The operation then proceeds to Step SG7.

SG7: In control unit 20, after starting the lock postponement and sending the lock postponement notification, panel lock controller 34 stands by waiting for an idle status notification from operational status manager 35 as the operational status notification (SH23 in FIG. 15). Upon receipt of the idle status notification from operational status manager 35, panel lock controller 34 cancels the lock postponement. The operation then proceeds to Step SG8. If not receiving the idle status notification, panel lock controller 34 continues to stand by.

The operation thereafter in Steps SG8 to SG12 are the same as that performed in Steps SG8 to SG12 of the operation for screen display notification of Embodiment 1 shown in FIG. 6, and is therefore not described again here.

SG13: In control unit 20, input-unit controller 32 stands by waiting for a lock postponement notification from panel lock controller 34. Upon receipt of a lock postponement notification from panel lock controller 34, the operation proceeds to Step SG14. If input-unit controller 32 does not receive a lock postponement notification, the operation proceeds to Step SG18.

SG14: In control unit 20, upon receipt of the lock postponement notification, input-unit controller 32 reads a job type (Copy in this embodiment) stored in job type storage area 41 of storage unit 26 by input-unit controller 32. Then, if the job type coincides with the type of the currently-executed job, the operation proceeds to Step SG15. If the job types do not coincide, the operation proceeds to Step SG18.

SG15: In control unit 20, after determining that the job types coincide, input-unit controller 32 sends display input unit 14 a panel lock warning screen display notification to display a panel lock warning screen shown in FIG. 13. Display input unit 14 then displays the panel lock warning screen on display part 14a as notified.

SG16: In control unit 20, after sending the panel lock warning screen notification, input-unit controller 32 stands by waiting for a press notification for input buttons 14b from display input unit 14, and upon receipt of the press notification, determines that the panel lock warning screen should be switched to a during-process screen of the currently-executed process. Then, the operation proceeds to Step SG17. If not receiving a press notification, input-unit controller 32 continues to stand by.

If no press notification is received from display input unit 14 while a print process is executed with the panel lock warning screen being displayed, upon receipt of a process end notification for the print process, the operation proceeds to Step SG18 with the panel lock warning screen being still displayed.

SG17: In control unit 20, after determining that the panel lock warning screen should be switched to a during-process screen of the currently-executed process, input-unit controller 32 sends display input unit 14 a screen hide notification to hide the panel lock warning screen, and a screen display notification to display the during-process screen of the currently-executed process (e.g., a Scanning screen display notification). The operation then proceeds to Step SG18. Upon receipt of the screen hide notification and the screen display notification, display input unit 14 hides the panel lock warning screen on display part 14a and switches it to the during-process screen as notified.

The operation thereafter in Steps SG18 to SG24 are the same as that in Steps SB12 to SB18 of the operation for the screen display notification of Embodiment 1 shown in FIG. 6, and is therefore not described again here.

By using the flowchart shown in FIG. 15 and following the steps denoted by SH, a description is given below of the operation for operational status notification performed by control unit 20 of multifunction peripheral 1 of this embodiment.

Operation in Steps SG1 to SH15 of this embodiment is the same as the operation for operational status notification in Steps SC1 to SC15 of Embodiment 1 shown in FIG. 7, and is therefore not described again here.

SH16: In control unit 20, operational status manager 35 stands by waiting for a process end notification from job manager 31. Upon receipt of a process end notification from job manager 31, the operation proceeds to Step SH17. If operational status manager 35 does not receive a process end notification, the operation proceeds to Step SH21.

SH17: In control unit 20, upon receipt of the process end notification, operational status manager 35 checks the current operational status control mode stored in storage unit 26. If the operational status control mode is "active," the operation proceeds to Step SH18. If the operational status control mode is "inactive," the operation proceeds to Step SH21 without updating the execution status.

SH18: In control unit 20, upon a recognition that the operational status control mode is "active", operational status manager 35 reads a job type (Copy in this embodiment) stored in job type storage area 41 of storage unit 26. If the job type thus read coincides with the type of the currently-executed job, the operation proceeds to Step SH19. If the job types do not coincide, the operation proceeds to Step SH20.

SH19: In control unit 20, upon a determination that the job types coincide, if a process end notification from job manager 31 is an image scan end notification, operational status manager 35 does not update the execution status of the process, and the operation proceeds to Step SH21. If the process end notification from job manager 31 is not an image scan end notification, the operation proceeds to Step SH20.

SH20: In control unit 20, upon a determination that the job types do not coincide, or a recognition that the process end notification received is not an image scan end notification, operational status manager 35 updates the execution status of the process stored in storage unit 26 to "not in execution," and the operation proceeds to Step SH21.

Operation performed thereafter in Steps SH21 to SH24 is the same as the operation for operational status notification in Steps SC19 to SC22 of Embodiment 1 shown in FIG. 7, and is therefore not described again here.

In this way, in this embodiment, when the operational status control mode is set to "active," upon receipt of an image scan end notification for an image scan process which is the first-half of the process of a Copy job, operational status manager 35 does not update the process execution status but maintains it to be "in execution," updated earlier in Step SH15 upon receipt of the image scan start notification. Then, operational status manager 35 updates the process execution status to "not in execution" upon receipt of a print end notification for a print process which is the second-half of the process of the Copy job. Thus, as a result of the operational status determination, the operational status notification in storage unit 26 is maintained to be a busy status notification when the image scan process is ended (Step SH24). Then, operational status manager 35 sends an idle status notification to panel lock controller 34 when the print process is ended. Thus, cancellation of the lock postponement can be delayed until the Copy job is ended.

Operation for operational status notification of this embodiment is the same as that of Embodiment 1 shown in FIG. 9, and is therefore not described again here.

A description is given below of the operation performed by multifunction peripheral 1 of this embodiment when a user uses multifunction peripheral 1 to perform a Copy or FTP transmission job.

The operation of multifunction peripheral 1 performed when the operational status control mode is set to "inactive" is the same as that of Embodiment 1 shown in FIG. 10, and is therefore not described again here.

By using the flowchart shown in FIG. 16 and following the steps denoted by SK, a description is given below of the operation of multifunction peripheral 1 of this embodiment performed when the operational status control mode is set to "active."

In this embodiment, when the operational status control mode is "active," the lock postponement function of authentication device 25 works. By using the lock postponement function, authentication device 25 postpones transmitting an input lock notification due to an authentication timeout during a Copy job which coincides with the progress presentation job type, and authentication device 25 transmits the input lock notification to multifunction peripheral 1 when cancelling the lock postponement upon receipt of an out-of-service notification transmitted from multifunction peripheral 1 in response to a print end notification sent when a print process is ended (YES in S13→S14→YES in S15→S16 in FIG. 13), i.e., multifunction peripheral 1 receives the input lock notification when the print process is ended. As an example in the following description, multifunction peripheral 1 receives an input lock notification (S11 in FIG. 5) due to an insufficient balance in the middle of a print process, which is the second-half of the process of a Copy job.

In the case of an FTP transmission job which does not coincide with the progress presentation job type, the upper use limits are not set, and therefore an input lock notification due to an insufficient balance is not transmitted. Thus, as in the case of the operation of multifunction peripheral 1 performed when the operational status control mode is "active," as soon as multifunction peripheral 1 ends an image scan process, which is the first-half of the process of the Copy job and the FTP transmission job, multifunction peripheral 1 receives an input lock notification due to authentication timeout transmitted from authentication device 25 upon cancellation of lock postponement (YES in S13→S14→YES in S15→S16 in FIG. 5).

Further, when the operational status control mode is changed to "active," operational status manager 35 updates the process execution status to "not in execution," the input status of display input unit 14 to "being inputted," and the operational status notification to a busy status notification, and stores these operational statuses and notification in storage unit 26 (SC5 in FIG. 7).

Figure 11:
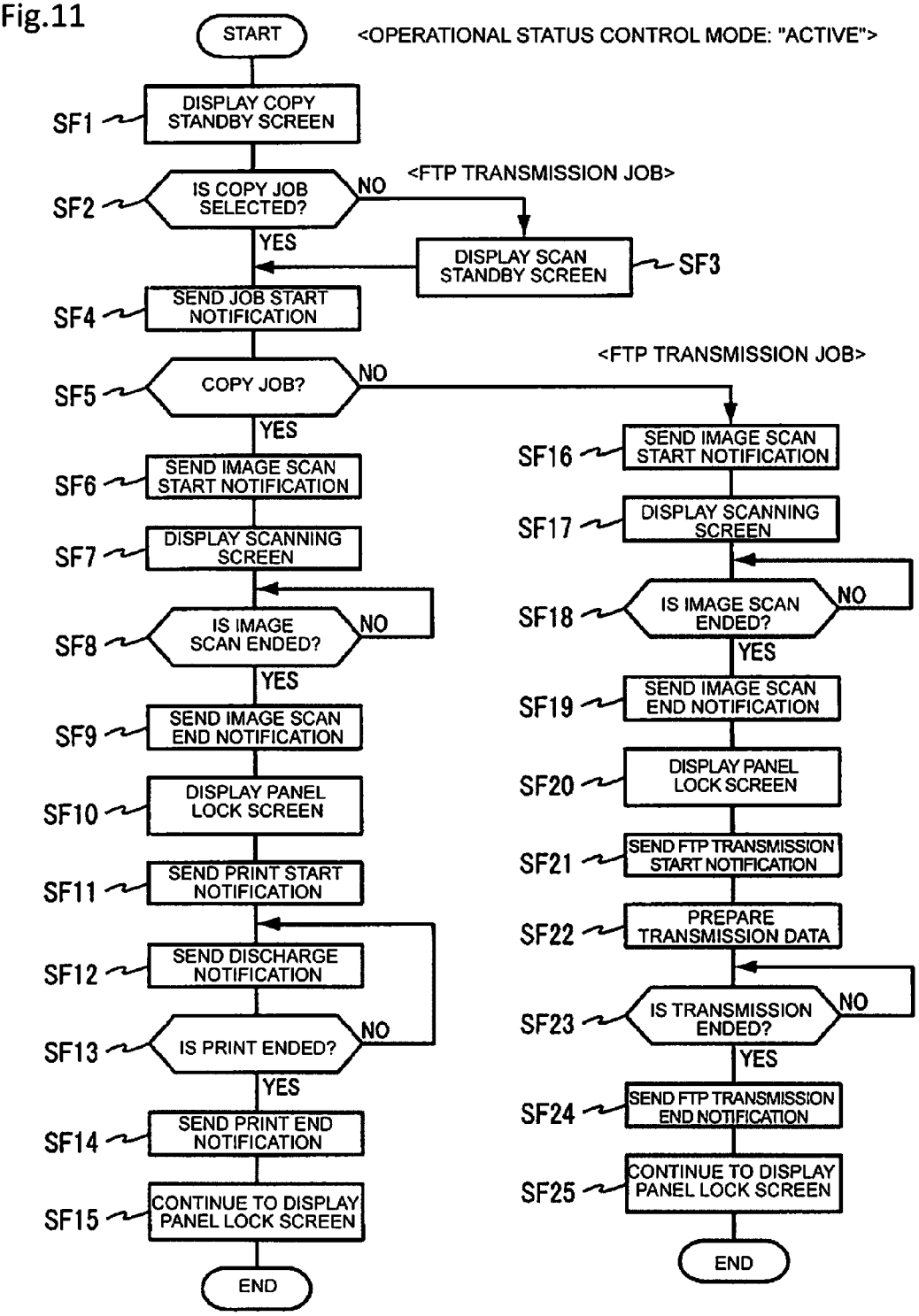
FIG. 11 is a flowchart showing the operation performed by the multifunction peripheral of Embodiment 1 when the operational status control mode is set to "active."

The operation in Steps SK1 to SK3 of this embodiment is the same as the operation of multifunction peripheral 1 in Steps SF1 to SF3 of Embodiment 1 shown in FIG. 11, and is therefore not described again here.

Note that, irrespective of whether authentication device 25 has the lock postponement function or not, the panel lock screen is not displayed to make multifunction peripheral 1 unavailable while a user is making various settings for a job on the Copy Standby screen (Step SK1) or on the Image Scan Standby screen (Step SK3). This is due to the same reason described above in Embodiment 1 using FIG. 11 for the operation of multifunction peripheral 1 performed when the operational status control mode is "active."

SK4: In control unit 20, upon receipt of a job start notification (a Copy start notification or an FTP transmission start notification) from display input unit 14, input-unit controller 32 sends job manager 31 the job start notification along with setting information for that job. Input-unit controller 32 checks the type of a job indicated by the job start notification. If the type of the job coincides with the progress presentation job type (Copy) stored in storage unit 26, the operation proceeds to Step SK5. If the type of the job does not coincide with the progress presentation job type (i.e., in a case of FTP transmission), the operation proceeds to Step SK6.

SK5: In control unit 20, upon recognition that the job types coincide, input-unit controller 32 stores "Copy" i.e., the name of the Copy job in job type storage area 41 of storage unit 26, and the operation proceeds to Step SK6.

SK6: In control unit 20, input-unit controller 32 which has received the job start notification from display input unit 14 sends job manager 31 the job start notification (the Copy start notification or the FTP transmission start notification) along with setting information for that job. Then, the operation proceeds to Step SK7.

SK7: In control unit 20, if the job start notification received by job manager 31 along with the setting information is a Copy start notification, the operation proceeds to Step SK8 to start the Copy job. If the job start notification is an FTP transmission start notification, the operation proceeds to Step SK21 to start the FTP transmission job.

SK8: In control unit 20, to start the Copy job, job manager 31 sends operational status manager 35 and input-unit controller 32 an image scan start notification to start an image scan process which is the first-half of the process of the Copy job and sends image scan controller 33 the image scan start notification and the Copy setting information.

Figure 15:
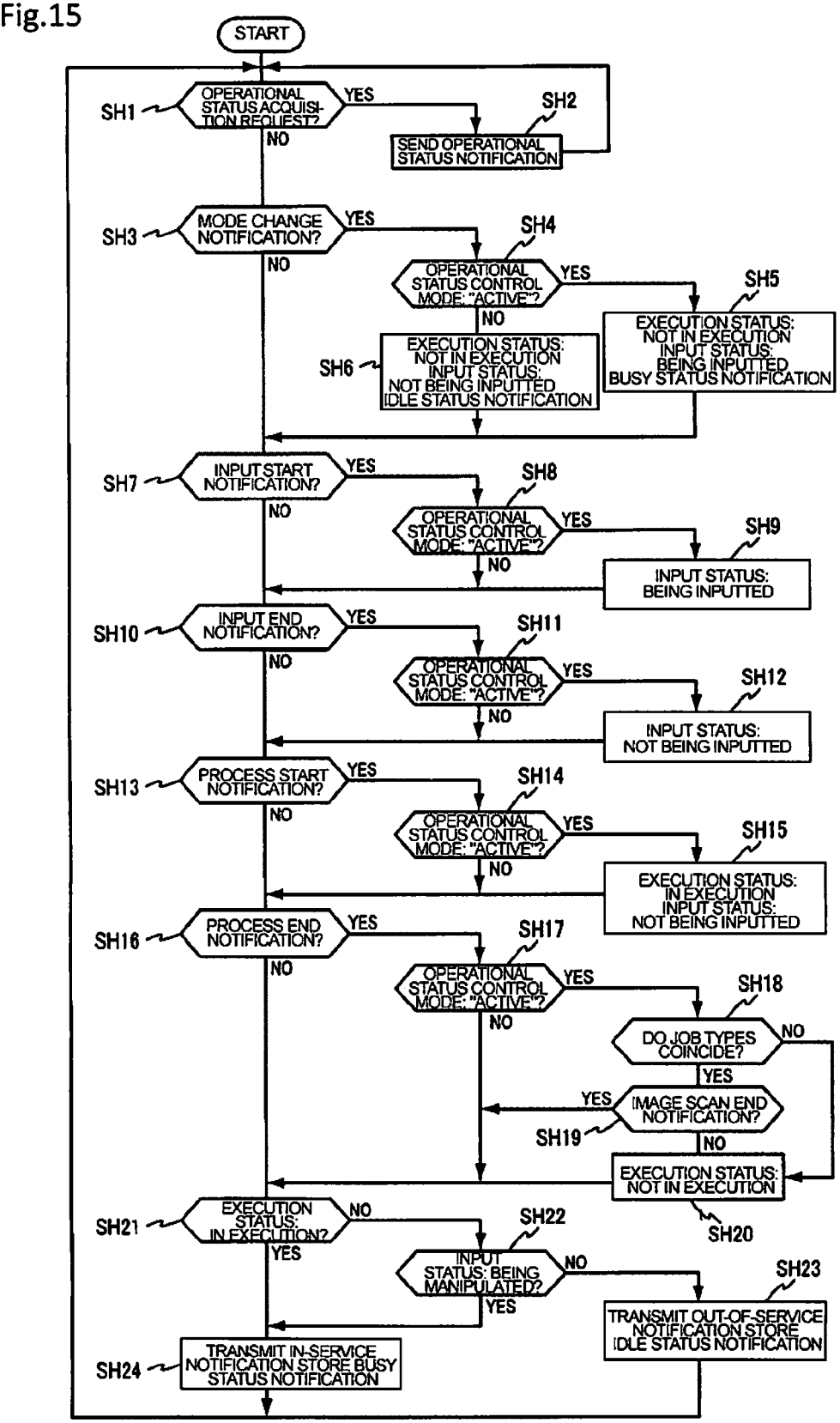
FIG. 15 is a flowchart showing the operation for operational status notification performed by the multifunction peripheral of Embodiment 2.

Since the operational status control mode is set to "active," in response to the image scan start notification, operational status manager 35 updates the execution status to "in execution," the input status to "not being inputted," and the operational status notification to a busy status notification (SH15 in FIG. 15), and then transmits an in-service notification to authentication device 25 (SH24 in FIG. 15).

SK9: In control unit 20, upon receipt of the image scan notification, input-unit controller 32 sends display input unit 14 a Scanning screen display notification to display the Scanning screen next. Then display input unit 14 switches the Copy Standby screen on display part 14a to the Scanning screen.

Figure 14:
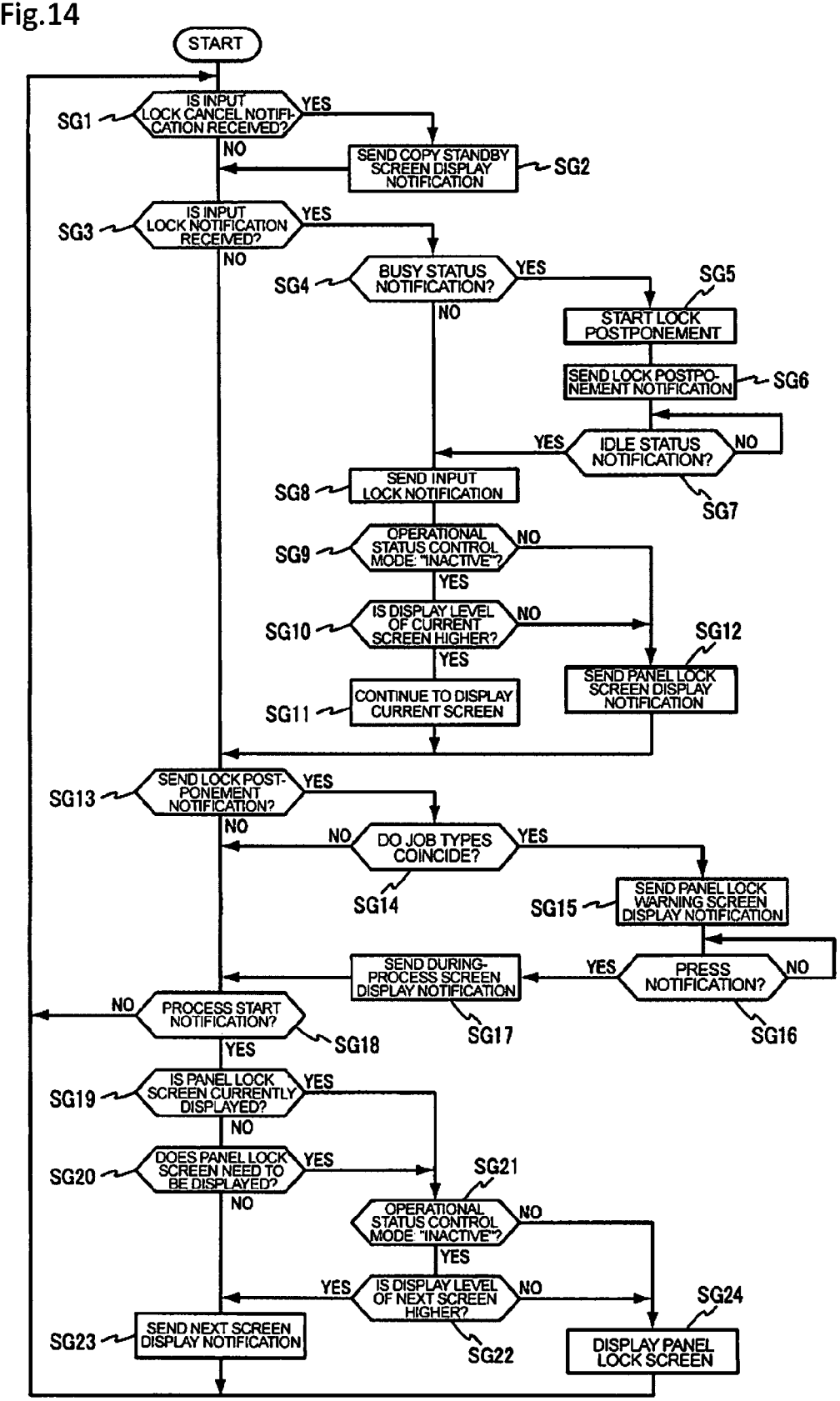
FIG. 14 is a flowchart showing the operation for screen display notification performed by the multifunction peripheral of Embodiment 2.

As in Embodiment 1 (FIG. 11), upon receipt of the image scan start notification, input-unit controller 32 sends the Scanning screen display notification to display the Scanning screen next because an input lock notification has not been received from authentication device 25 and the panel lock screen is not displayed (YES in SG18→NO in SG19→NO in SG20→SG23 in FIG. 14).

SK10: In control unit 20, upon receipt of the image scan start notification along with the Copy setting information, image scan controller 33 scans, with scanner 17, an image on a document set by the user on ADF 15 or on contact glass 16, according to the Copy setting information. Meanwhile, image scan controller 33 stands by waiting for completion of the scan. Upon completion of the scan, the operation proceeds to Step SK11. During the scan, image scan controller 33 continues to stand by.

During the image scan process, the Scanning screen displayed on display part 14a presents the progress of the image scan by showing which document out of the total number of documents is currently being scanned.

Suppose a case where panel lock controller 34 receives, in the middle of this image scan process, an input lock notification from authentication device 25 which transmits the input lock notification irrespective of the operational state of multifunction peripheral 1. In such a case, since the operational status control mode is set to "active" and the operational status notification acquired from operational status manager 35 is a busy status notification, panel lock controller 34 starts lock postponement, sends a lock postponement notification to input-unit controller 32, and stands by waiting for an idle status notification from operational status manager 35 (YES in SG3→YES in SG4→SG5→SG6→SG7 in FIG. 14). Upon receipt of the lock postponement notification, input-unit controller 32 instructs display input unit 14 to display a panel lock warning screen (see FIG. 13) on its display part 14a since the job types (Copy) coincide. When the user presses any of input buttons 14b, input-unit controller 32, receiving a press notification, instructs display input unit 14 to hide the panel lock warning screen and to display, on display part 14a, the Scanning screen which is the during-process screen of the process currently executed (YES in SG13→YES in SG14→SG15→YES in SG16→SG17 in FIG. 14). Note that the panel lock screen is displayed after the Copy job is ended (see Step SK20).

SK11: In control unit 20, upon recognition that the document scan is ended, image scan controller 33 sends job manager 31 an image scan end notification along with scanned image data.

SK12: In control unit 20, after receiving the image scan end notification, job manager 31 sends operational status manager 35 the image scan end notification. Then, job manager sends operational status manager 35 and input-unit controller 32 a print start notification to start a print process which is the second-half of the process of the Copy job, and sends image processor 27 the print start notification along with the Copy setting information and the image data.

Unlike Embodiment 1 (FIG. 11), upon receipt of the image scan end notification, operational status manager 35 does not update the operational statuses in storage unit 26 and transmits an in-service notification to authentication device 25 because the operational status control mode is set to "active," the job types (copy) coincide, and the process end notification is the image scan end notification (YES in SH16→YES in SH17→YES in SH18→YES in SH19, SH24 in FIG. 15). Lock postponement performed by authentication device 25 upon receipt of this in-service notification is continued until authentication device 25 receives an out-of-service notification (S15 in FIG. 5). Further, even if panel lock controller 34 has already started lock postponement, panel lock controller 34 continues the lock postponement because an idle status notification is not sent yet at this point.

Moreover, like Embodiment 1 (FIG. 11), upon receipt of the print start notification, operational status manager 35 updates the operational statuses and notification, i.e., updates the execution status to "in execution," the input status to "not being inputted," and the operational status notification to a busy status notification (SH15 in FIG. 15), and transmits an in-service notification to authentication device 25 (SH24 in FIG. 15). In other words, the execution status of the operational statuses is maintained to be "in execution."

SK13: In control unit 20, upon receipt of the print start notification, input-unit controller 32 sends display input unit 14 a Printing screen display notification to display the Printing screen next. Then, display input unit 14 switches the Scanning screen on display part 14a to the Printing screen.

In this step, in response to the print start notification, input-unit controller 32 sends the Printing screen display notification to display the Printing screen next because an input lock notification has not been received and the panel lock screen is not displayed (YES in SG18→NO in SG19→NO in SG20→SG23 in FIG. 14).

SK14: In control unit 20, upon receipt of the print start notification along with the Copy setting information and the image data, image processor 27 starts the print process, and sends print unit 2 converted print data and the copy setting information, as in Step SE12 for the "inactive" case (FIG. 10) in Embodiment 1.

Moreover, in control unit 20, panel lock controller 34 monitors for the receipt of an input lock notification from authentication device 25. Then, if panel lock controller 34 receives an input lock notification, panel lock controller 34 and the image processor 27 start to operate in parallel, and the operation proceeds to Step SK15. If panel lock controller 34 does not receive an input lock notification, the operation proceeds to Step SK17.

SK15: In control unit 20, after receiving the input lock notification from authentication device 25, panel lock controller 34 starts the parallel operation and sends operational status manager 35 a request to acquire the operational status notification. Since operational status manager 35 does not update the process execution status upon receipt of the image scan end notification in Step SK11 above, and maintains the execution state to be "in execution" upon receipt of the print start notification, the operational status notification currently stored in storage unit 26 is a busy status notification. Thus, operational status manager 35 reads the busy status notification and sends it to panel lock controller 34 (SH2 in FIG. 15). Since the operational status control mode is set to "active," upon receipt of the busy status notification, panel lock controller 34 starts lock postponement and sends a lock postponement notification to input-unit controller 32. Then, panel lock controller 34 stands by waiting for an idle status notification from operational status manager 35 (YES in SG3→YES in SG4→SG5→SG6→SG7 in FIG. 14). Note that this lock postponement is continued until the print process is ended (see Step SK20).

Meanwhile, since the job types (Copy) coincide, upon receipt of the lock postponement notification, input-unit controller 32 instructs display input unit 14 to display the panel lock warning screen on display part 14a of display input unit 14 (YES in SG13→YES in SG14→SG15 in FIG. 14).

SK16: In control unit 20, upon receipt of the lock postponement notification, input-unit controller 32 stands by waiting for a press notification for input buttons 14b from display input unit 14. If input-unit controller 32 does not receive a press notification during execution of the print process, upon receipt of a print end notification, the operation proceeds to Step SK19 with the panel lock warning screen still being displayed.

On the other hand, upon receipt of a press notification during execution of the print process, input-unit controller 32 sends display input unit 14 a hide screen notification to hide the panel lock warning screen and a during-process screen display notification to display a during-process screen of the print process currently being executed (i.e., the Printing screen). Then, the operation proceeds to Step SK19. The display input unit 14 hides the panel lock warning screen on display part 14a and switches it to the Printing screen as notified (YES in SG16→SG17 in FIG. 14). The Printing screen redisplayed continues to show the progress of the print process until the print process is ended.

SK17: In control unit 20, upon receipt of the print data and the Copy setting information, like in Step SE12 for the "inactive" case (FIG. 10) in Embodiment 1, print unit 2 prints an image from the received print data on a sheet and sends a discharge notification upon every discharge of a printed sheet. Job manager 31 transmits the discharge notification to authentication device 25 (S6 in FIG. 5).

SK18: In control unit 20, print unit 2 stands by waiting for completion of the printing while continuing monitoring for receipt of an input lock notification, and sending the discharge notification. Then, upon completion of the printing, print unit 2 sends a print completion notification to image processor 27, and the operation proceeds to Step SK19. During execution of the printing process, the operation returns to Step SK14 to continue standing by and the parallel operation. During the printing process, the panel lock warning screen or the Printing screen is displayed on display part 14a.

SK19: In control unit 20, upon receipt of the print completion notification, image processor 27 sends a print end notification to job manager 31, and job manager 31 sends operational status manager 35 the print end notification and sends input-unit controller 32 a job end notification for Copy.

Here, the operational status control mode is set to "active," the job types (Copy) coincide, and the process end notification is a print end notification. Thus, upon receipt of the print end notification, unlike Embodiment 1 above (FIG. 11), operational status manager 35 updates the execution status of the operational statuses to "not in execution" and the operational status notification to an idle status notification. Then, operational status manager 35 sends an idle status notification to panel lock controller 34 and transmits an out-of-service notification to authentication device 25 (YES in SH16→YES in SH17→YES in SH18→NO in SH19→SH20, SH23 in FIG. 15).

SK20: In control unit 20, upon receipt of the job end notification for Copy, input-unit controller 32 instructs display input unit 14 to display the panel lock screen on its display part 14*a*.

More specifically, upon receipt of the idle status notification from operational status manager 35, panel lock controller 34 cancels the lock postponement and sends input-unit controller 32 an input lock notification. Upon receipt of the input lock notification, input-unit controller 32 sends a panel lock screen display notification to display input unit 14 since the operational status notification is set to "active." Then, display input unit 14 switches the Printing screen on display part 14*a* to the panel lock screen (SG8→NO in SG9→SG12 in FIG. 14).

Meanwhile, upon receipt of the out-of-service notification, authentication device 25 cancels the lock postponement and transmits an input lock notification to panel lock controller 34. Upon receipt of the input lock notification, panel lock controller 34 sends input-unit controller 32 the input lock notification because an operational status notification acquired is an idle status notification. Upon receipt of the input lock notification from panel lock controller 34, input-unit controller 32 tries to send a panel lock screen display notification to display input unit 14 (YES in SG3→NO in SG4→SG8→NO in SG9→SG12 in FIG. 14), but does not send the panel lock screen display notification after all since it has already sent the panel lock screen display notification earlier.

If panel lock controller 34 does not receive the input lock notification in Step SK14 earlier, the Printing screen on display part 14*a* of display input unit 14 is switched to the panel lock screen by an input lock notification sent from panel lock controller 34 to input-unit controller 32 in response to an input lock notification from authentication device 25.

Further, in switching to the panel lock screen, if the panel lock warning screen is displayed, input unit controller 32 sends display input unit 14 a panel lock warning screen hide notification and a panel lock screen display notification. Display input unit 14 then hides the panel lock warning screen on display part 14*a* and switches it to the panel lock screen.

After the panel lock screen is displayed, control unit 20 deletes the job name stored in job type storage area 41 and returns to Step SK1 to stand by with the panel lock screen being displayed.

In multifunction peripheral 1 of this embodiment, the Copy job is executed in this way when the operational status control mode is set to "active."

Operation for the FTP transmission job performed by multifunction peripheral 1 of this embodiment (Steps SK21 to SK30) is the same as that in Embodiment 1 (Steps SF16 to SF25 in FIG. 11), and is therefore not described again here.

In a case of FTP transmission, in Step SK24, upon receipt of an image scan end notification, operational status manager 35 updates the execution status of the operational statuses to "not in execution" and the operational status notification to an idle status notification because the operational status control mode is set to "active" and the type of the job, FTP transmission, does not coincide with the job type (Copy) stored. Then, operational status manager 35 sends an idle status notification to panel lock controller 34 and transmits an out-of-service notification to authentication device 25 (YES in SH16→YES in SH17→NO in SH18→SH20, SH23 in FIG. 15).

Moreover, in Step SK30, upon a determination to continue displaying the panel lock screen, control unit 20 deletes the job name stored in job type storage area 41 and returns to Step SK1 to stand by with the panel lock screen being displayed.

In multifunction peripheral 1 of this embodiment, the FTP transmission job is executed in this way when the operational status control mode is set to "active."

As described above, this embodiment offers the following effect in addition to the effects offered by Embodiment 1. Specifically, when the operational status control mode is set to "active" and the progress presentation job type is preset to enable a during-process screen to continue being displayed, if a job executed coincides with the preset job type, transmission of an out-of-service notification to authentication device 25 and the sending of an idle status notification to panel lock controller 34 are postponed until the job is ended. This is irrespective of whether or not authentication device 25 is configured to postpone transmission of an input lock notification depending on the operational status of multifunction peripheral 1. Then, upon receipt of an input lock notification from authentication device 25, multifunction peripheral 1 displays a panel lock warning screen to allow a redisplay of a during-process screen of the process in execution. Through the panel lock warning screen, a user can be notified in advanced that the panel lock screen is displayed immediately after the job is ended. If the user operates input buttons 14*b*, the during-process screen of the process in execution can be displayed. Thus, according to the will of the user, the progress of the process can continue to be presented to the user until the executed job is ended. Since the screen is not switched to the panel lock screen in response to an input lock notification from authentication device 25 to make the user unable to check the progress on the during-process screen, user convenience can be improved.

Although the progress presentation job type is only the Copy job in Embodiment 2, by setting the FTP transmission job, or other job, as the progress presentation job type and storing it in the storage unit, the same effect as that offered in the case of the Copy job can be obtained for the FTP transmission job, too. Moreover, more than one progress presentation job type can be set and stored in the storage unit.

In addition, although the progress presentation job type is preset and stored in the storage unit in Embodiment 2, without setting the progress presentation job type, Step SK4 (FIG. 16) may be omitted, and the input-unit controller may store the job name of the job to be executed in the job type storage area in Step SK5. In this way, the same effect as that offered in the case of the Copy job can be obtained for all the jobs executed. If a job is executed through three or more processes, Steps SH16 to SH20 (FIG. 15) may be modified so that the process execution status is updated to "not in execution" upon receipt of a process end notification for the final process.

Further, although a job executed by the multifunction peripheral is either Copy or FTP transmission in the embodiments above, the invention is applicable to any job by setting a display level to each screen displayed for the job, defining a notification treated as a process start notification and a notification treated as a process end notification for that job, and causing the job manager to send the input-unit controller and the operational status manager those notifications.

Further, although the printing apparatus is a multifunction peripheral (MFP) in the embodiments above, the invention is applicable to an apparatus such as a printer which is connected to an authentication device and includes a display part and input buttons.

Furthermore, although the authentication function and the function of transmitting an input lock notification are distributed to the authentication server and the authentication device in the embodiments above, the authentication function of the authentication server may be integrated in the authentication device so that the authentication function and the function of transmitting an input lock notification can be performed by the single authentication device.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A printing apparatus configured to perform input restriction or cancel the input restriction according to a notification received from an authentication device, the printing apparatus comprising:
   a job manager configured to manage a job to be executed and provide notice of a start of a process necessary to execute the job;
   an input-unit controller configured to control which screen to display on a display part of a display input unit and to control an input status of an input button of the display input unit;
   an operational status manager configured to retain a current execution status of a process and a current input status of the input button; and
   a panel restriction controller configured to receive, from an authentication device, an input restriction notification to restrict input of the input button of the display input unit and an input restriction cancel notification to cancel the input restriction, wherein
   a display level is preset for each screen to be displayed on the display part, and an operational status control mode of the printing apparatus is set to be active or inactive,
   upon receipt of the input restriction cancel notification from the authentication device, the panel restriction controller notifies the input-unit controller of cancellation of the input restriction to display an initial screen on the display part,
   upon receipt of the input restriction notification from the authentication device,
      if an operational status of the printing apparatus retained by the operational status manager is a busy status, the panel restriction controller sends a notification of the input restriction to the input-unit controller after postponing the sending until the operational status changes to an idle status, and
      if the operational status of the printing apparatus retained by the operational status manager is the idle status, the panel restriction controller immediately sends the notification of the input restriction to the input-unit controller upon a receipt of the input restriction notification,
   upon receipt of the notification of the input restriction, if the operational status control mode is set to be active, the input-unit controller displays a panel restriction screen on the display part, and
   upon receipt of the notification of the input restriction, if the operational status control mode is set to be inactive, the input-unit controller compares the display level of a current screen currently being displayed with the display level of a next screen to be displayed next and displays the screen with the higher display level on the display part.

2. The printing apparatus according to claim 1, further comprising a storage unit configured to store therein a job type being a type of a job to be executed, wherein
   when notified by the job manager of a start of a job to be executed, the input-unit controller stores the job type of the job in the storage unit, and
   upon receipt of the notification of the input restriction from the panel restriction controller, if the operational status control mode is set to be active, and if the job currently in execution coincides with the job type stored in the storage unit, the input-unit controller displays, on the display part, a warning screen indicating that the panel restriction screen is displayed when the job is ended.

3. The printing apparatus according to claim 1, wherein the display level of each screen is set such that the display level of a screen indicating that a process is in execution is higher than the display level of the panel restriction screen, and such that the display level of a screen indicating that a process is in standby is lower than the display level of the panel restriction screen.

4. The printing apparatus according to claim 1, wherein the operational status manager includes a function of transmitting an operational state of the printing apparatus to the authentication device,
   if the operational status control mode is set to be active, the operational status manager transmits an operational state notification indicating the operational state of the printing apparatus to the authentication device according to the retained execution status and input status,
   if the operational status control mode is set to be inactive, the operational status manager always transmits an out-of-service notification, indicating that the printing apparatus is out of service, to the authentication device, and
   if receiving an in-service notification indicating that the printing apparatus is in service from the operational status manager, the authentication device transmits the input restriction notification to the panel restriction controller after postponing the transmission until the authentication device receives the out-of-service notification.

5. The printing apparatus according to claim 4, wherein upon receipt of a press notification indicating that the input button is pressed down from the input-unit controller, the operational status manager transmits the in-service notification to the authentication device.

6. An image processing apparatus, comprising:
   an input unit configured to receive a user's input;
   a display configured to display a status of the image processing apparatus; and
   a controller configured, if the image processing apparatus is not in progress of any image processing when a condition to lock the user's input through the input unit is satisfied, to display, at the display, information indicating lock of the user's input through the input unit, and
   the controller is configured, if the image processing apparatus is in process of an image processing when the condition to lock the user's input through the input unit is satisfied, to display, at the display, the information of the lock of the user's input through the input unit after the image process is completed,
   wherein the information of the lock of the user's input through the input unit is information indicating that the apparatus is currently operating in an unauthorized state.

7. The image processing apparatus according to claim 6, wherein the image processing comprises one of a print process to print an image on a medium, and a scan process to scan an image to create image data.

8. The image processing apparatus according to claim 6, wherein the information of the lock of the user's input through the input unit is information indicating that the user's input through the input unit is not accepted.

9. An image processing apparatus comprising:
an input unit configured to receive a user's input;
a display configured to display a status of the image processing apparatus;
a controller configured to restrict an operation of the input unit; and
an image scanning unit configured to scan an image, wherein
the controller is configured, if the image processing apparatus is not in progress of any image processing when a certain condition is satisfied, to display information of the restriction of the operation of the input unit at the display,
the controller is configured, if the image processing apparatus is in process of an image processing when the certain condition is satisfied, to display a status of the image process at the display, and then to display the information of the restriction at the display after the image process is completed, and
the controller is configured, if the image processing apparatus is in process of scanning as the image processing when the certain condition is satisfied, to display the number of scanned pages as a status of the scanning at the display, and then to clear the number of scanned pages and display information of the restriction at the display after the scanning is completed.

10. An image processing apparatus, comprising
an input unit configured to receive a user's input;
a printing unit configured to print an image on a medium;
a display configured to display a status of the image processing apparatus; and
a controller configured, if the image processing apparatus is not in progress of any image processing when a condition to lock the user's input through the input unit is satisfied, to display, at the display, information indicating lock of the user's input through the input unit, and
the controller is configured, if the image processing apparatus is in process of an image processing when the condition to lock the user's input through the input unit is satisfied, to display, at the display, the information of the lock of the user's input through the input unit after the image process is completed, wherein
the controller is configured, if the image processing apparatus is in process of printing as the image processing when the condition to lock the user's input through the input unit is satisfied, to display the number of printed pages as a status of the printing at the display, and then to clear the number of printed pages and display information of the restriction at the display after the printing is completed.

* * * * *